United States Patent
Tanno

(10) Patent No.: US 11,365,146 B2
(45) Date of Patent: Jun. 21, 2022

(54) JOINING METHOD FOR OPTICAL PART

(71) Applicant: DISCO CORPORATION, Tokyo (JP)

(72) Inventor: Yasushi Tanno, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 706 days.

(21) Appl. No.: 16/376,437

(22) Filed: Apr. 5, 2019

(65) Prior Publication Data

US 2019/0315646 A1 Oct. 17, 2019

(30) Foreign Application Priority Data

Apr. 13, 2018 (JP) .............................. JP2018-077494

(51) Int. Cl.
| | |
|---|---|
| C03B 23/20 | (2006.01) |
| C03C 27/08 | (2006.01) |
| C04B 37/00 | (2006.01) |
| C03B 19/14 | (2006.01) |
| C03C 21/00 | (2006.01) |

(52) U.S. Cl.
CPC .......... *C03B 19/143* (2013.01); *C03C 21/008* (2013.01); *C04B 37/005* (2013.01); *C04B 2237/365* (2013.01); *C04B 2237/52* (2013.01)

(58) Field of Classification Search
CPC ................................ C03C 27/08; C03B 23/20
See application file for complete search history.

(56) References Cited

U.S. PATENT DOCUMENTS

| | | | |
|---|---|---|---|
| 2005/0173058 A1* | 8/2005 | Chien ..................... | G02B 7/02 156/281 |
| 2005/0266252 A1* | 12/2005 | Rita ........................ | C03B 19/06 257/E23.009 |
| 2006/0162849 A1* | 7/2006 | Han ......................... | C30B 33/06 156/325 |
| 2014/0083597 A1* | 3/2014 | Kalkowski .............. | B32B 37/14 156/308.2 |

FOREIGN PATENT DOCUMENTS

| | | |
|---|---|---|
| JP | 10092702 A | 4/1998 |
| JP | 2010046696 A | 3/2010 |

* cited by examiner

*Primary Examiner* — Cynthia Szewczyk
(74) *Attorney, Agent, or Firm* — Greer Burns & Crain Ltd.

(57) ABSTRACT

A method for joining an optical part made of quartz glass and a supporting part made of ceramic includes forming a metal layer on a surface of the supporting part by electroless plating, polishing the formed metal layer with a polishing pad to form a first smoothed face on the supporting part surface, polishing a surface of the optical part with the polishing pad to form a second smoothed face, cleaning the first smoothed face and the second smoothed face with ultrasonic cleaning water, forming a first metal film on the first smoothed face by vapor deposition and forming a second metal film on the second smoothed face by vapor deposition, and joining the first metal film and the second metal film to each other by interatomic joining by atomic diffusion between the faces at which the first metal film and the second metal film contact with each other.

6 Claims, 12 Drawing Sheets

JOINING METHOD FOR OPTICAL PART

BACKGROUND OF THE INVENTION

Field of the Invention

The present invention relates to a joining method for an optical part.

Description of the Related Art

In a laser processing apparatus that processes a workpiece using a laser beam, heat is generated in an optical part, which configures the laser processing apparatus, by the laser beam. This gives rise to a problem that the optical part such as a lens, a mirror, a prism, a diffraction grating, optical crystal or the like, is distorted, resulting in deterioration of the laser processing accuracy. In view of this problem, in order to remove heat from an optical part, it is desirable to use a material having a high thermal conductivity for a supporting part that supports the optical part in the laser processing apparatus. Also it is preferable for the material of the supporting part to have a low coefficient of thermal expansion such that the supporting part may not be deformed by heat. As such a material that is high in thermal conductivity and is less liable to be subject to thermal expansion as just described, it is sufficient if fine ceramics containing boron nitride (BN) or silicon carbide (SiC) is used.

There is a problem that, if an optical part made of glass material and a supporting part made of fine ceramics are joined together by a screw or the optical part is sandwiched by a supporting part, then force is applied to the optical part and the optical part is distorted thereby. Further, if adhesive made of polymer resin is used to adhere an optical part and a supporting part to each other, then gas is sometimes generated from the adhesive by laser light passing through the optical part, resulting in degradation of an optical characteristic of the optical part. Furthermore, there is a problem that the adhesive is deteriorated by a laser beam, resulting in coming off of the optical part from the supporting part.

As a countermeasure for solving such problems as described above, a method is conceivable which uses atomic diffusion bonding (ADB) disclosed in Japanese Patent No. 5401661, which bonds different materials such as, for example, quartz glass material and fine ceramics to each other at the atomic level. According to the atomic diffusion bonding, a thin film of predetermined metal is formed on a joining surface of one or both of the two different materials in a vacuum atmosphere, and the formed metal films are contacted with each in this environment such that they are joined together.

As another example of the countermeasure for solving such problems as described above, for example, a method is conceivable which uses surface-activated room-temperature bonding (SAB) disclosed in Japanese Patent No. 2791429. In the surface-activated room-temperature bonding, the joining surface is sputtered with an argon ion beam or plasma argon gas in vacuum to remove pollutant on the joining surface. By joining clean surfaces (activated surfaces) formed by such sputtering to each other, the two different materials can be joined together in the solid phase at a room temperature without a pressure.

SUMMARY OF THE INVENTION

However, in the case where atomic diffusion bonding is applied to joining between a supporting part and an optical part, since fine ceramics that forms the supporting part has pores (gaps) from its structure, a gap is formed on the surface thereof contacting with the optical part, and impurity is likely to remain in the gap. From the reasons described, there is a problem that the joining force between the supporting part and the optical part and the heat removal action from the optical part by the supporting part are degraded.

Meanwhile, surface-activated room-temperature bonding has a problem that it cannot be used for quartz glass that is a material of the optical part.

Therefore, it is an object of the present invention to provide a joining method for an optical part capable of joining an optical part and a supporting part made of different materials and capable of allowing the optical part to be cooled efficiently.

In accordance with an aspect of the present invention, there is provided a joining method for an optical part for joining an optical part made of quartz glass material and a supporting part made of fine ceramics for supporting the optical part to each other. The joining method includes a metal layer forming step of forming a metal layer on a surface of the supporting part by electroless plating, a first smoothed face forming step of polishing the metal layer formed by the metal layer forming step with a polishing pad to a given thickness and forming a first smoothed face on the surface of the supporting part, a second smoothed face forming step of polishing a surface of the optical part with the polishing pad to form a second smoothed face, a cleaning step of cleaning the first smoothed face and the second smoothed face with cleaning water to which an ultrasonic wave is propagated, a metal film forming step of forming a first metal film on the first smoothed face by vapor deposition or sputtering and forming a second metal film on the second smoothed face by vapor deposition or sputtering in a vacuum chamber, and a joining step of joining the first metal film and the second metal film by interatomic joining by atomic diffusion that occurs between the contacting faces of the first metal film and the second metal film.

Preferably, the joining step is carried out in the vacuum chamber.

Preferably, the metal film forming step forms the first metal film and the second metal film using Au (gold) or Pt (platinum), and the joining step is performed by contacting the first metal film and the second metal film of gold films or platinum films with each other in an atmospheric pressure space.

In accordance with another aspect of the present invention, there is provided a joining method for an optical part for joining an optical part made of quartz glass material and a supporting part made of fine ceramics for supporting the optical part to each other. The joining method includes a first metal layer forming step of forming a first metal layer on a surface of the supporting part by electroless plating, a second metal layer forming step of forming a second metal layer on a surface of the optical part by electroless plating, a first smoothed face forming step of polishing the first metal layer to a given thickness with a polishing pad and forming a first smoothed face, a second smoothed face forming step of polishing the second metal layer to a given thickness with the polishing pad and forming a second smoothed face, a cleaning step of cleaning the first smoothed face and the second smoothed face with ultrasonic cleaning water to which an ultrasonic wave is propagated, a film removing step of irradiating ion or plasma, which is generated by supplying rare gas into a vacuum chamber in which the supporting part and the optical part are accommodated and applying a high frequency voltage to the rare gas, upon the first smoothed face and the second smoothed face to remove films such as an oxide film or a nitride film unnecessary for joining of the first smoothed face and the second smoothed face, and a joining step of contacting, after the removing step, the activated first smoothed face and the activated second smoothed face with each other to join the first smoothed face and the second smoothed face to each other by metal bonding.

Preferably, the joining step is carried out in the vacuum chamber.

Preferably, the first metal layer and the second metal layer are formed using Au (gold) or Pt (platinum), and the joining step is carried out in an atmospheric pressure space.

With the joining method for an optical part according to the one aspect of the present invention, the optical part and the supporting part formed from different types of materials can be joined together with high joining force. Further, since the optical part is joined over a somewhat great contact area with the supporting part having a high thermal conductivity, efficient removal of heat from the optical part by the supporting part when the optical part is used can be achieved. Further, since the optical part and the supporting part are joined together through metal, pores (gaps) of fine ceramics that configures the supporting part do not appear at the joining location to the optical part, and even if the optical part is used and has heat, the joining force between the supporting part and the optical part does not decrease, and the heat removal efficiency by the supporting part does not decrease.

With the joining method for an optical part according to the another aspect of the present invention, the optical part and the supporting part made of different materials from each other can be joined together by strong joining force, and by joining the optical part over a certain great contact area to the supporting part having a high thermal conductivity, efficient heat removal by the supporting part upon use of the optical part can be achieved. Further, since the optical part and the supporting part are joined together through metal, pores (gaps) of the fine ceramics configuring the supporting part do not appear at the joining location to the optical part, and even if the optical part is used and comes to have heat, the joining force between the supporting part and the optical part does not drop and the heat removal efficiency by the supporting part does not drop.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
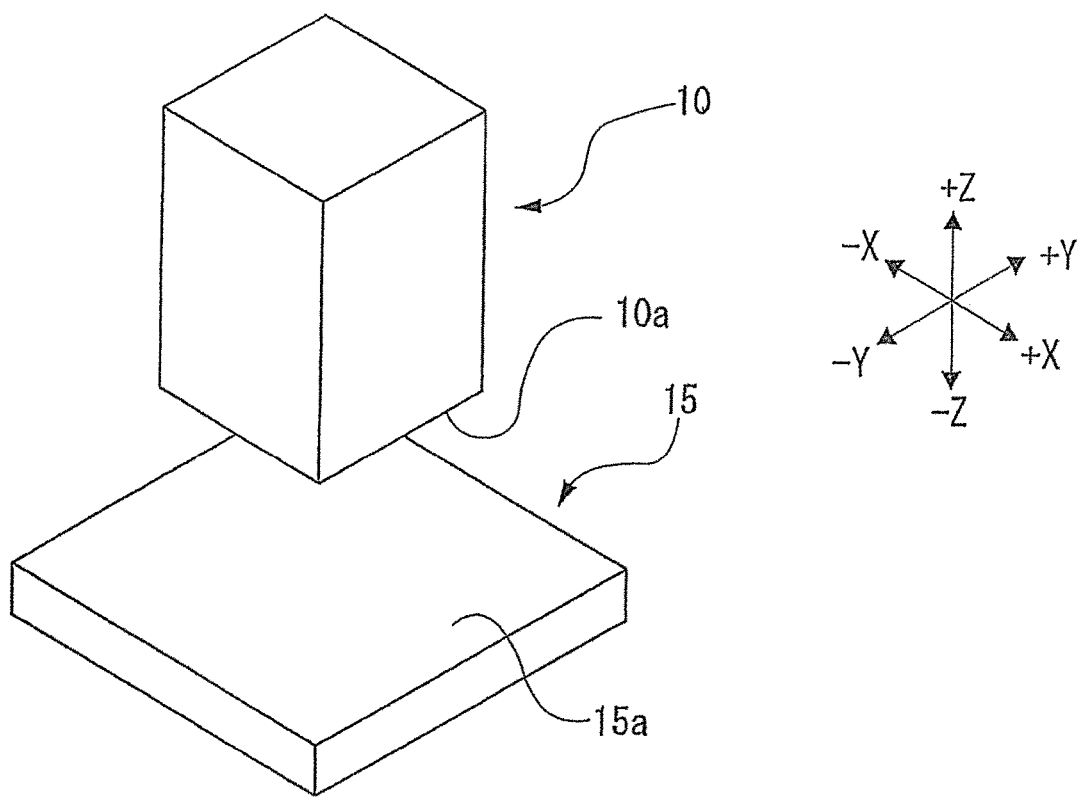
FIG. 1 is a perspective view depicting an example of an optical part and a supporting part.

In the following, steps of a joining method in the case where a joining method according to the present invention (hereinafter referred to as joining method of the first embodiment) is carried out to join an optical part 10 and a supporting part 15 depicted in FIG. 1 are successively described. The joining method of the first embodiment is a joining method that utilizes atomic diffusion bonding (ADB).

The optical part 10 depicted in FIG. 1 is, for example, a beam splitter, a diffraction grating, a lens, a mirror or the like provided in a laser processing apparatus, and is made of quartz glass material and has an outer shape of a parallelepiped. A substantially flat surface 10a of the optical part 10, which is directed downwardly in FIG. 1, is a joining face to be joined to a supporting part 15. It is to be noted that the outer shape of the optical part 10 is not limited to a parallelepiped shape. The optical part 10 made of quartz glass material has a thermal conductivity of 1.3 W/(m·K) and has a thermal expansion coefficient of 0.5 to $0.6 \times 10^{-6}/°$ C.

The supporting part 15 depicted in FIG. 1 is made of fine ceramics (for example, boron nitride, silicon carbide or the like) and has an outer shape of a rectangular flat plate. A substantially flat surface 15a of the supporting part 15, which is directed upwardly in FIG. 1, serves as a joining face to be joined to the surface 10a of the optical part 10 and is set so as to have an area greater than that of the surface 10a of the optical part 10. It is to be noted that the outer shape of the supporting part 15 is not limited to a shape of a rectangular flat plate.

In the case where the supporting part 15 is made of fine ceramics containing boron nitride, the supporting part 15 has a thermal conductivity of 30 to 35 W/(m·K) and has a thermal expansion coefficient of 1.2 to $1.3 \times 10^{-6}/°$ C.

In the case where the supporting part 15 is made of fine ceramics containing silicon carbide, the supporting part 15 has a thermal conductivity of 200 to 270 W/(m·K) and has a thermal expansion coefficient of $4.5 \times 10^{-6}/°$ C.

Since the thermal conductivity of the supporting part 15 is high in comparison with the optical part 10 in this manner, even if the optical part 10 is used and has heat, the heat is removed efficiently by the supporting part 15 joined to the optical part 10. Further, since also the thermal expansion coefficient of the supporting part 15 has a low value, the supporting part 15 is not expanded exceeding an allowable value by heat.

(1) Metal Layer Forming Step

Figure 2:
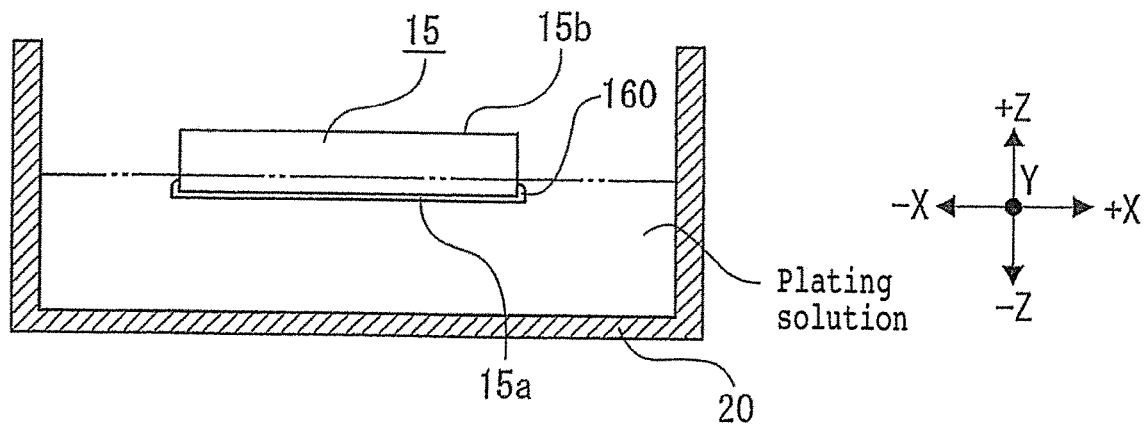
FIG. 2 is a sectional view illustrating a state in which a metal layer is formed on the surface of the supporting part by electroless plating.

First, as depicted in FIG. 2, a metal layer (plating layer) is formed by electroless plating on the surface 15a of the supporting part 15. The electroless plating can plate not only a metal material but also fine ceramics as in the case of the supporting part 15.

In a plating tank 20 of a box shape depicted in FIG. 2, for example, nickel plating solution composed of nickel sulfate, nickel nitrate, nickel sulfamate or the like and reducing agent is stored. Thus, the supporting part 15 is immersed into the nickel plating solution from the surface 15a side. It is to be noted that at least a rear face 15b of the supporting part 15 remains outside the nickel plating solution. By electrons from the reducing agent in the plating solution, nickel ion is reduced and precipitated with a uniform thickness on the surface 15a of the supporting part 15. Then, the electroless plating is performed for a fixed period of time to form a metal layer 160 of a predetermined thickness (for example, approximately 10 μm) on the surface 15a of the supporting part 15.

It is to be noted that the metal layer 160 formed by electroless plating may not be a nickel layer (Ni layer) but may be an iron layer (Fe layer), a cobalt layer (Co layer), a copper layer (Cu layer), a silver layer (Ag layer), a lead layer (Sn layer), a platinum layer (Pt layer) or a metal layer (Au layer).

Figure 3:
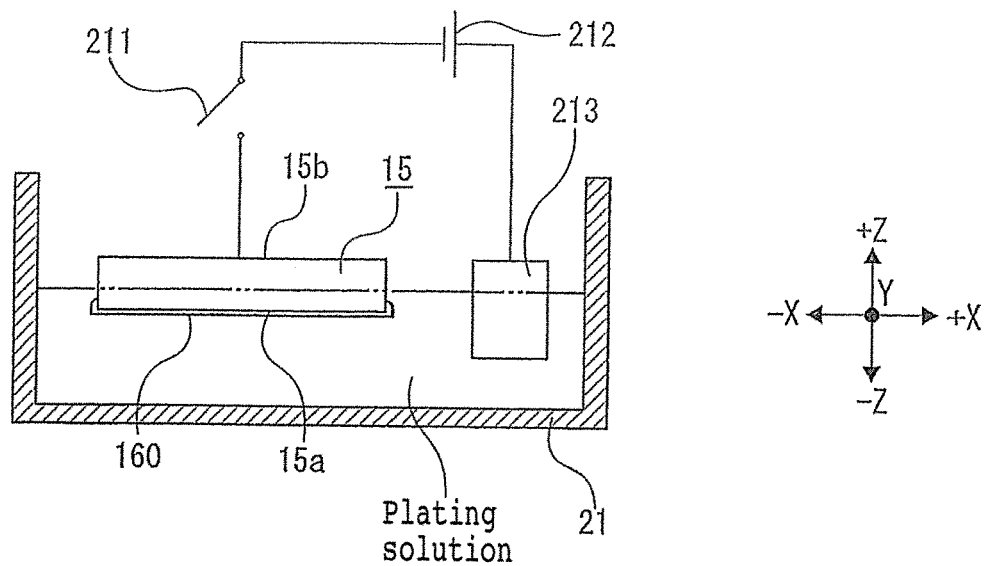
FIG. 3 is a sectional view illustrating a state in which the thickness of the metal layer formed on the surface of the supporting part is increased by electroplating.

In the present embodiment, for example, after the this metal layer 160 of a predetermined thickness (approximately 10 μm) is formed on the surface 15a of the supporting part 15, in order to further increase the thickness of the metal layer 160, electroplating is performed on the metal layer 160 of the supporting part 15 as depicted in FIG. 3 with metal same as the metal configuring the metal layer 160.

In a box-shaped plating tank 21 depicted in FIG. 3 to which the supporting part 15 is transported from the plating tank 20 depicted in FIG. 2, nickel plating solution of, for example, nickel sulfate, nickel nitrate, nickel sulfamate or the like is stored. In the plating tank 21, the metal layer 160 of the supporting part 15 is connected to the negative electrode of a direct current (DC) power supply 212 through a switch 211. Further, electrolytic metal 213 (for example, nickel) soaked in the plating solution is connected to the positive electrode of the DC power supply 212.

Then, the switch 211 is turned on to pass current through the nickel plating solution using the metal layer 160 of the supporting part 15 as a cathode and using the electrolytic metal 213 as an anode. As a result, the ionized nickel in the nickel plating solution is reduced and precipitated on the metal layer 160 of the cathode to further increase the thickness of the metal layer 160 (nickel layer). Then, the electroplating is performed for a predetermined period of time until the thickness of the metal layer 160 increases to a predetermined thickness (for example, 50 μm). The metal layer having the increased thickness is hereinafter referred to as metal layer 161 (refer to FIG. 4). It is to be noted that the thickness of the metal layer 161 preferably is 50 to 100 μm.

Figure 4:
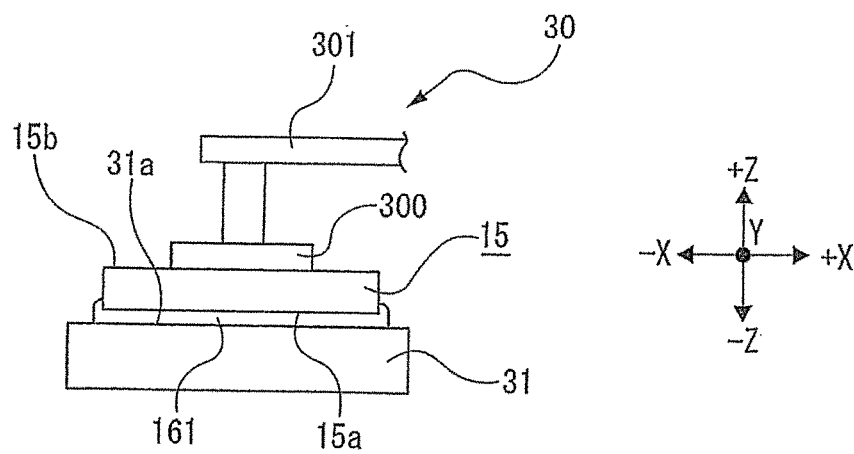
FIG. 4 is a side elevational view illustrating a state in which the supporting part having the metal layer formed thereon is placed on a temporary placement table by transporting means.

Then, transporting means 30 depicted in FIG. 4 carries out the supporting part 15 on which the metal layer 161 is formed from the plating tank 21 depicted in FIG. 3 and carries the supporting part 15 onto a temporary placement table 31 having a placement face 31a depicted in FIG. 4. The transporting means 30 depicted in FIG. 4 includes a suction pad 300 having, for example, an outer shape of a flat plate and having a lower face (suction face) for attracting and holding the supporting part 15, and an arm 301 that supports the suction pad 300 thereon and is movable in a horizontal direction and an upward and downward direction.

The transporting means 30 depicted in FIG. 4 sucks and holds the rear face 15b of the supporting part 15 depicted in FIG. 3 and pulls up the supporting part 15 from the plating tank 21. Then, the transporting means 30 having the supporting part 15 sucked and held thereon is moved up to a position above the temporary placement table 31 depicted in FIG. 4 and places the supporting part 15 on the placement face 31a, whereafter it is spaced away from the supporting part 15.

Figure 5:
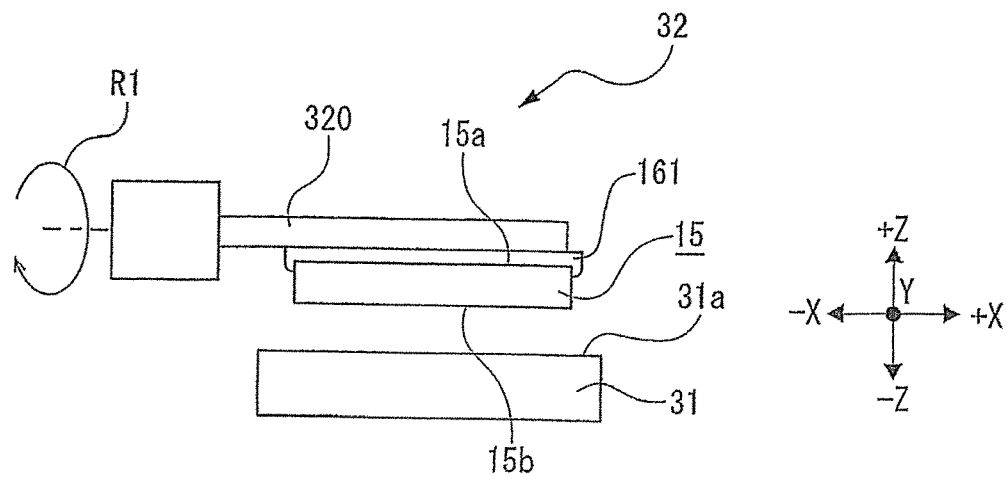
FIG. 5 is a side elevational view illustrating a state in which the supporting part is reversed by reversing means such that the metal layer is directed upwardly.

As depicted in FIG. 5, for example, the supporting part 15 placed on the placement face 31a of the temporary placement table 31 is vertically reversed between the surface 15a and the rear face 15b by reversing means 32. The reversing means 32 is movable in a horizontal direction and an upward and downward direction, and places the supporting part 15 into a state in which the rear face 15b is directed downwardly as depicted in FIG. 5 by sucking and holding the metal layer 161 formed on the supporting part 15 by a suction member 320 and rotating the suction member 320 in the direction indicated by an arrow mark R1. It is to be noted that the configuration of the reversing means 32 is not limited to that of the example described above and the reversing means 32 may otherwise be configured such that it reverses the supporting part 15, for example, so as to place the surface 15a and the rear face 15b upside down in a state in which it sandwiches the supporting part 15 from the outer circumference side.

(2) First Smoothed Face Forming Step

Then, the metal layer 161 formed on the supporting part 15 in the metal layer forming step is chemical mechanical polishing (CMP) polished by a polishing pad until it has a predetermined thickness and a first smoothed face is formed on the surface 15a of the supporting part 15. In particular, for example, the reversing means 32 depicted in FIG. 5 carries the supporting part 15 onto a holding table 33 having a holding face 33a depicted in FIG. 6. The vertical reversal of the supporting part 15 described hereinabove may be performed on the holding table 33.

It is to be noted that the CMP polishing is wet polishing using polishing liquid (slurry). The polishing of the metal layer 161 may be dry polishing that is performed by pressing a dry polishing pad containing abrasive grain against the metal layer 161 without using polishing liquid.

The holding face 33a of the holding table 33 is formed, for example, from a porous member or the like and is communicated with a suction source not depicted such as a vacuum generation apparatus such that suction force generated by suction by the suction source is transmitted to the same. The holding table 33 is rotatable around an axis extending in the Z-axis direction by rotating means not depicted. The reversing means 32 depicted in FIG. 5 places the supporting part 15 on the holding table 33 in a state in which the metal layer 161 is directed to the upper side. Then, after the supporting part 15 is sucked to and held on the holding table 33, the reversing means 32 is spaced away from the supporting part 15.

Figure 6:
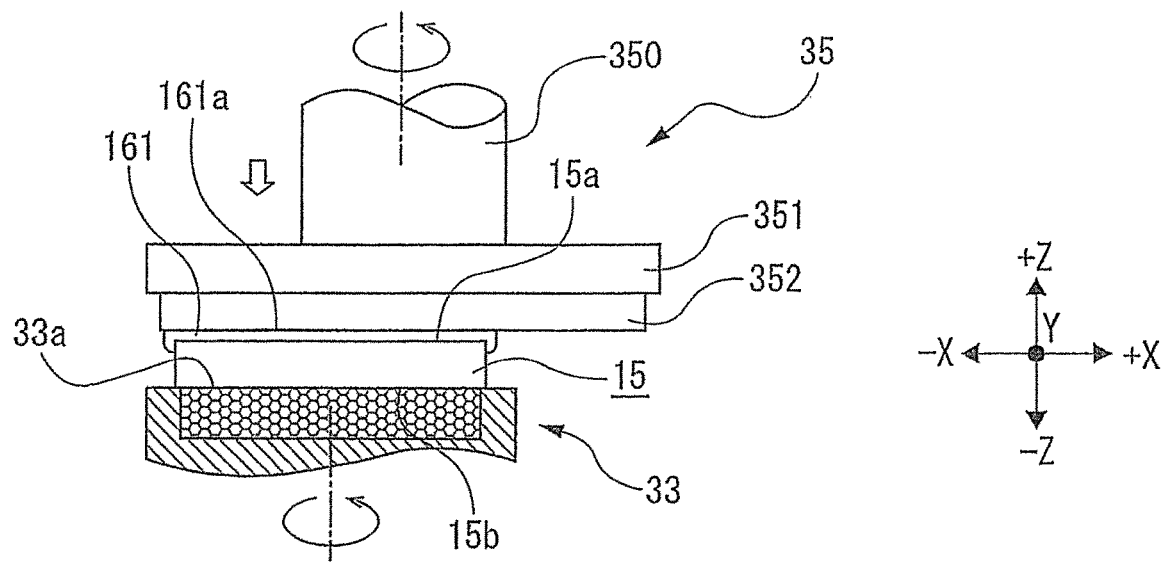
FIG. 6 is a side elevational view illustrating a state in which the metal layer of the supporting part is polished by a polishing pad.

Polishing means 35 depicted in FIG. 6 polishes the metal layer 161 formed on the supporting part 15. The polishing means 35 is configured from a spindle 350 having an axial direction, for example, coincident to the vertical direction (Z-axis direction), a motor not depicted for driving the spindle 350 to rotate, a mount 351 in the form of a circular plate fixed to a lower end of the spindle 350, and a circular polishing pad 352 removably attached to a lower face of the mount 351. The polishing pad 352 is formed from nonwoven fabric such as, for example, felt and has a through-hole formed at a central portion thereof such that slurry passes through the through-hole. The polishing face (lower face) of the polishing pad 352 is greater, for example, than a polished face (upper face) of the metal layer 161 of the supporting part 15.

A slurry flow path is formed so as to extend in an axial direction in the inside of the spindle 350 and is communicated with slurry supplying means not depicted. Slurry supplied from the slurry supplying means to the spindle 350 is jetted from an opening at a lower end of the slurry flow path toward the polishing pad 352 and arrives at a contacting location between the polishing pad 352 and the metal layer 161 through the through-hole of the polishing pad 352.

The slurry to be used contains, as polishing particles (free abrasive grain), at least one of silica particles, alumina particles, ceria particles, titania particles, zirconia particles and germanium particles. Further, in order to accelerate the polishing speed, preferably the slurry contains metal oxidizing agent. The metal oxidizing agent to be contained is, for example, hydrogen peroxide, peroxosulfate, nitric acid, potassium periodate, hypochlorous acid, ozone or the like.

The holding table 33 is positioned at a predetermined polishing processing position at which the polishing means 35 is to polish the metal layer 161. The positioning is performed such that the polishing pad 352 contacts with the overall polished face (upper face) of the metal layer 161 as depicted in FIG. 6.

As depicted in FIG. 6, when the spindle 350 is driven to rotate by the motor not depicted, the polishing pad 352 is rotated. Further, the polishing means 35 moves down until the polishing pad 352 is brought into contact with the metal layer 161 to perform polishing processing. Further, when the holding table 33 rotates at the predetermined rotational speed, also the supporting part 15 held on the holding face 33a rotates, and therefore, the polishing pad 352 performs polishing processing of the overall polished face of the metal layer 161. Further, during CMP polishing processing, slurry is supplied to the contacting location between the polishing pad 352 and the metal layer 161.

For example, by moving the polishing pad 352 away from the metal layer 161 having been CMP polished to a thickness of approximately 30 μm, a first smoothed face 161a (polished face 161a of the metal layer 161) is formed on the surface 15a of the supporting part 15. It is to be noted that preferably the thickness of the metal layer 161 after the polishing is equal to or greater than 30 μm but equal to or smaller than 100 μm, and the flatness of the first smoothed face 161a preferably is equal to or smaller than 1.5 nm. Although, even if the metal layer 161 after the polishing is greater than 100 μm, it can be joined to the optical part 10 at a joining step hereinafter described, since time is required for formation of the metal layer 161 at the metal layer forming step described above, the thickness preferably is equal to or smaller than 100 μm.

The reason why (1), at the metal layer forming step, electroless plating is performed to form the thin metal layer 160 (refer to FIG. 2) on the supporting part 15 and then electroplating is performed such that the metal layer 160 is grown on the thick metal layer 161 and (2), at the first smoothed face forming step, the metal layer 161 is polished so as to be thinned to a predetermined thickness is such as described below.

In order to form a metal layer having a high degree of flatness and having a uniform thickness, if a thick metal layer is formed and then thinned by polishing, then it is easy to form a metal layer of a uniform thickness. Therefore, it is necessary to form a thick metal layer on the supporting part 15. Here, although much time is required to form a thick metal layer only by electroless plating, electroplating can form a thick metal layer in a short period of time.

However, since the supporting part 15 made of fine ceramics is low in conductivity, a metal layer cannot be formed on the surface 15a of the supporting part 15 if electroless plating is not used. Therefore, if the thin metal layer 160 is formed on the surface 15a of the supporting part 15 by electroless plating first and then a metal layer is laminated by electroplating on the metal layer 160 formed by the electroless plating, then the thick metal layer 161 can be formed. Then, by making the thickness of the metal layer 161 equal to or greater than 30 μm but equal to or smaller than 100 μm by polishing, the first smoothed face 161a flattened to a high level of the flatness equal to or smaller than 1.5 nm can be obtained.

Further, since the metal layer 160 formed only by electroless plating is thin, some unevenness is sometimes formed on the surface of the metal layer 160 by an influence of unevenness (pores) of the surface 15a of the supporting part 15. Therefore, the metal layer 161 (for example, of 50 μm thick) that fills up the unevenness on the surface of the metal layer 160 by electroplating is formed on the metal layer 160 of approximately 10 μm thick formed by electroless plating. Then, by polishing the metal layer 161 of 50 μm thick to a thickness of approximately 30 μm, the first smoothed face 161a that does not expose the unevenness formed on the surface of the metal layer 160 by electroless plating can be obtained.

(3) Second Smoothed Face Forming Step

Figure 7:
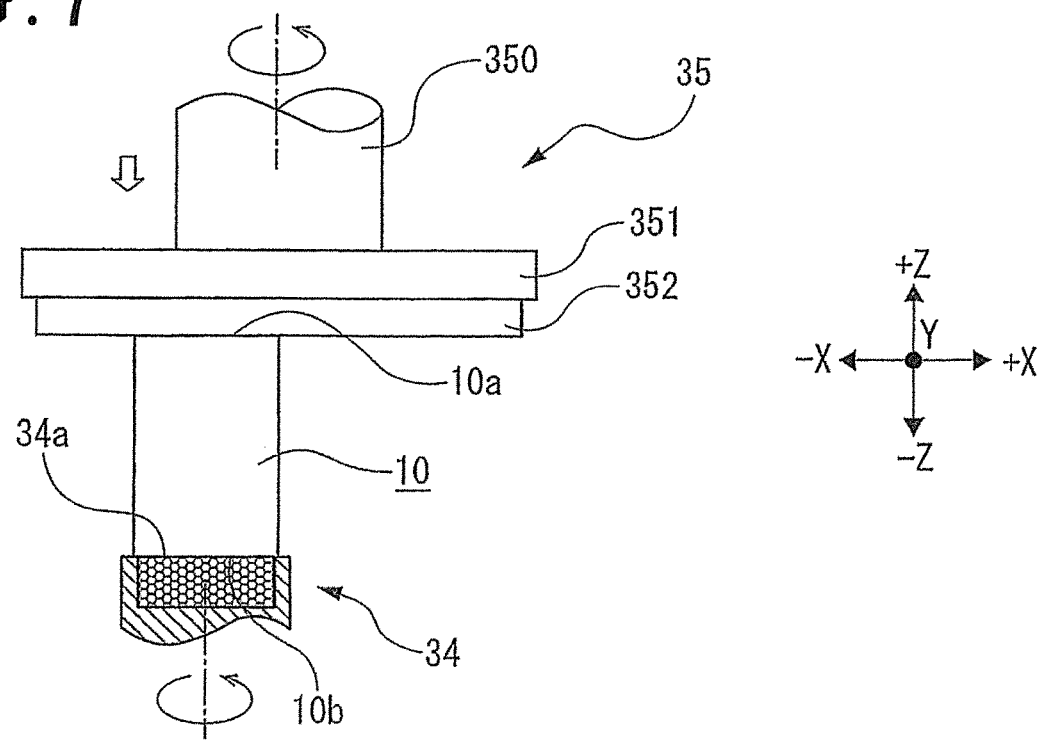
FIG. 7 is a side elevational view illustrating a state in which the surface of the optical part is polished with a polishing pad.

In parallel to, or before or after, carrying out the metal layer forming step and the first smoothed face forming step for the supporting part 15, a second smoothed face forming step is carried out by which, for example, the surface 10a of the optical part 10 depicted in FIG. 7 is CMP polished with the polishing pad 352 to form a second smoothed face.

A holding table 34 that sucks and holds the optical part 10 to and on the holding table 34 thereof is positioned at a predetermined polishing processing position at which the polishing means 35 is to polish the surface 10a of the optical part 10. The positioning is performed such that, for example, the polishing pad 352 is contacted with the overall surface 10a of the optical part 10.

As depicted in FIG. 7, the polishing means 35 moves down until the rotating polishing pad 352 is brought into contact with the surface 10a of the optical part 10 to perform polishing processing. This polishing is performed by supplying, while the holding table 34 is rotated at a predetermined rotational speed, slurry (for example, slurry same as the slurry used at the first smoothed face forming step) to a contacting location between the polishing pad 352 and the surface 10a of the optical part 10.

Then, after the surface 10a of the optical part 10 is polished until the flatness thereof becomes equal to or smaller than 1.5 nm, the CMP polishing for the surface 10a of the optical part 10 is ended, and the surface 10a of the optical part 10 becomes the surface 10a. It is to be noted that the formation of the second smoothed face 10a may be performed by dry polishing.

(4) Cleaning Step

Figure 8:
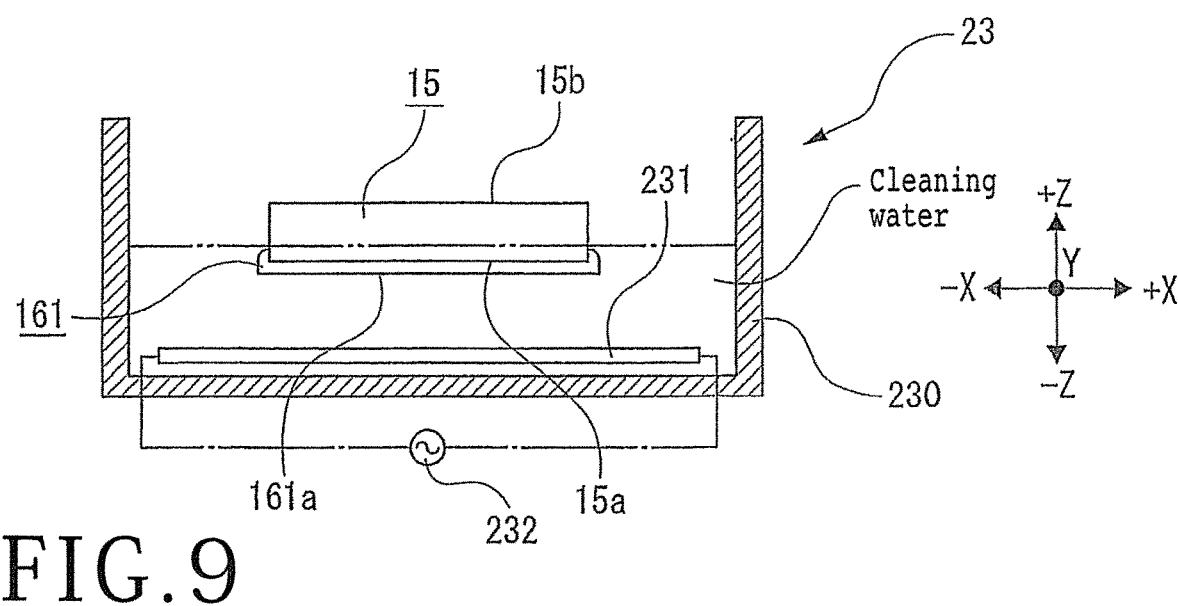
FIG. 8 is a sectional view illustrating a state in which a first smoothed face of the supporting part is ultrasonically cleaned.

Transporting means not depicted carries the supporting part 15 having the first smoothed face 161a depicted in FIG. 6 into an ultrasonic cleaning apparatus 23 depicted in FIG. 8. In a box-shaped water tank 230 configuring the ultrasonic cleaning apparatus 23 has cleaning water such as, for example, pure water stored therein. In the water tank 230, a ultrasonic wave oscillation unit 231 including an oscillation element (piezoelectric element) or the like and capable of oscillating an ultrasonic wave is disposed, and a high frequency power supply 232 that supplies high frequency electric power is connected to the ultrasonic wave oscillation unit 231.

If predetermined high frequency electric power is supplied from the high frequency power supply 232 to the ultrasonic wave oscillation unit 231 in a state in which the supporting part 15 is soaked in the cleaning water in the water tank 230 from the first smoothed face 161a side, then the ultrasonic wave oscillation unit 231 converts the predetermined high frequency electric power into mechanical oscillation to oscillate an ultrasonic wave of a predetermined oscillation frequency. Then, the first smoothed face 161a of the supporting part 15 is cleaned with the cleaning water to which the oscillated ultrasonic wave is propagated. In particular, polishing waste or the like sticking to the first smoothed face 161a is removed by shock waves when air bubbles generated in the cleaning water by the ultrasonic wave (cavitation air bubbles) hit upon and are broken by the first smoothed face 161a.

Similarly, the transporting means not depicted carries the optical part 10 having the second smoothed face 10a depicted in FIG. 7 into the ultrasonic cleaning apparatus 23 depicted in FIG. 8. Then, the second smoothed face 10a of the optical part 10 is ultrasonically cleaned by the ultrasonic cleaning apparatus 23.

(5) Masking Step

Figure 9:
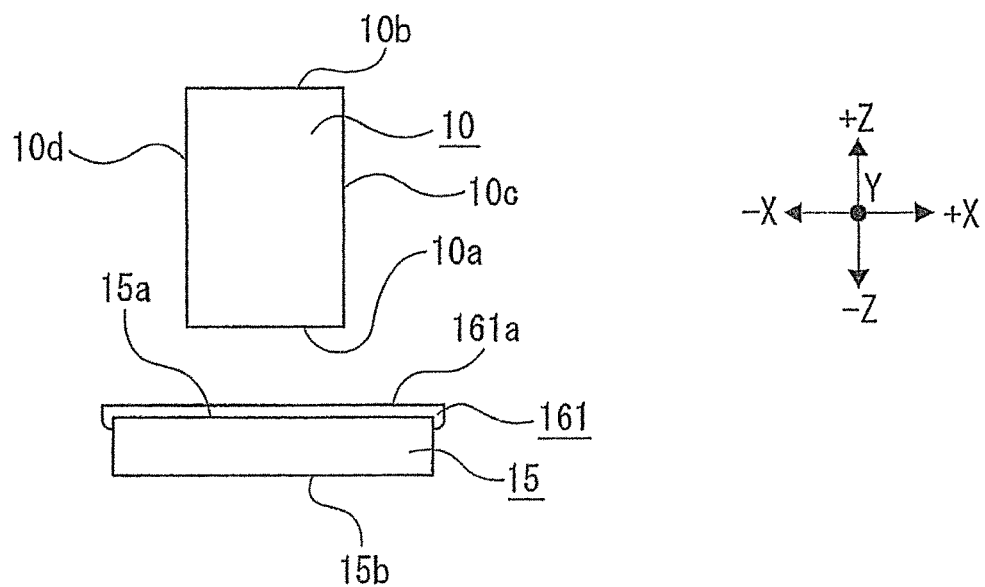
FIG. 9 is a side elevational view illustrating a masking step.

For example, in the present embodiment, a masking step is performed for masking one of faces of the supporting part 15 depicted in FIG. 9 other than the first smoothed face 161a or one of faces of the optical part 10 other than the second smoothed face 10a. It is to be noted that a metal film forming step may be carried out without carrying out the masking step.

In particular, in such a case that, in the case where the optical part 10 joined to the supporting part 15 is incorporated into the laser processing apparatus, for example, the side faces 10c and 10d of the optical part 10 depicted in FIG. 9 become passing faces through which the laser beam is to pass or in a like case, for example, a protective film that can be removed by cleaning is formed on the side faces 10c and 10d of the optical part 10. Then, at a metal film forming step hereinafter described, a metal film is not formed directly on the side faces 10c and 10d of the optical part 10. As the formation method of the protective film, a conventionally known method such as spray coating of protective film agent to the side faces 10c and 10d of the optical part 10 or sticking of a seal member to the side faces 10c and 10d of the optical part 10 is performed. Further, the masking step may be performed, for example, before the second smoothed face forming step.

(6) Metal Film Forming Step

Then, a metal film forming step of forming a first metal film by vapor deposition on the first smoothed face 161a of the supporting part 15 and forming a second metal film by vapor deposition on the second smoothed face 10a of the optical part 10 is carried out in a vacuum chamber. It is to be noted that, at the metal film forming step, not vapor deposition but sputtering may be applied to form a first metal film and a second metal film.

Figure 10:
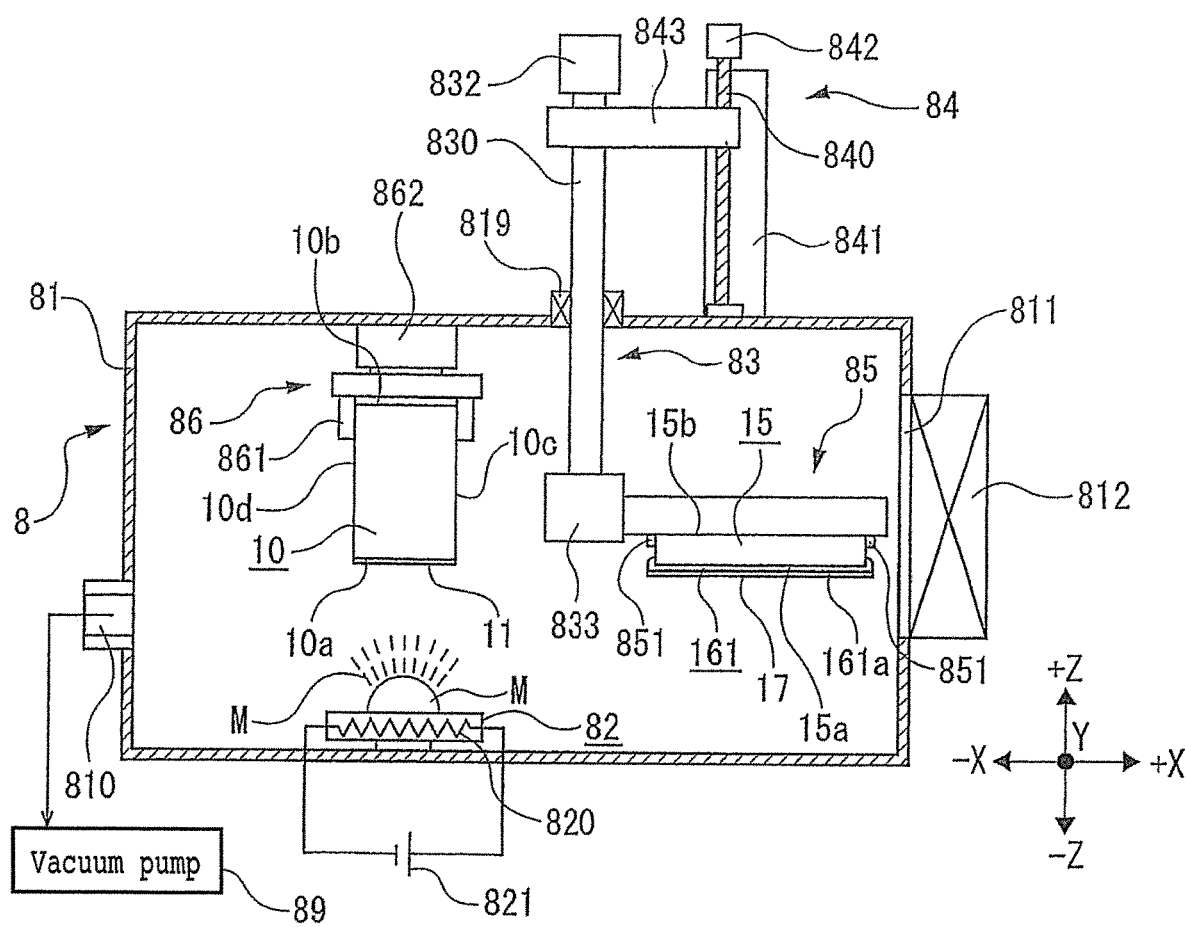
FIG. 10 is a sectional view illustrating a state in which a first metal film is formed on the first smoothed face by vapor deposition and a second metal film is formed on a second smoothed face of the optical part by vapor deposition in a vacuum room of a vacuum vapor deposition apparatus.

The supporting part 15 and the optical part 10 are carried into a vacuum vapor deposition apparatus 8 depicted in FIG. 10, for example, by transporting means not depicted. For example, an exhaust port 810 is formed in a side wall of a chamber 81 of the vacuum vapor deposition apparatus 8, and a vacuum pump 89 for sucking air in the chamber 81 is connected to the exhaust port 810. By rendering the vacuum pump 89 operative, the inside of the chamber 81 can be decompressed to a predetermined vacuum atmosphere. In a side portion of the chamber 81, a loading/unloading port 811 and a gate valve 812 for opening and closing the loading/unloading port 811 are provided.

A table 82 on which metal M (for example, nickel) that is a film formation material is placed is disposed at a lower portion in the inside of the chamber 81. For example, in the inside of the table 82, a heater 820 that generates heat if current is supplied to a heat generating member (resistor member) is disposed, and a power supply 821 is connected to the heater 820. By supplying predetermined electric power from the power supply 821 to the heater 820, the heater 820 heats and evaporates the metal M from the inside of the table 82.

The metal M depicted in FIG. 10 may be not nickel but may be Al (aluminum), Si (silicon), Ti (titanium), V (vanadium), Cr (chromium), Fe (iron), Co (cobalt), Cu (copper), Zn (zinc), Ga (gallium), Ge (germanium), Zr (zirconium), Nb (niobium), Mo (molybdenum), Ru (ruthenium), Rh (rhodium), Pd (palladium), Ag (silver), In (indium), Sn (tin), Hf (hafnium), Ta (tantalum), Pt (platinum), Au (gold) or the like.

In the case where the metal M is a low melting point metal, the heating of the metal M may be performed, for example, by high frequency induction heating, but in the case where the metal M is a high melting point metal, the heating of the metal M may be performed, for example, by electron beam heating.

At an upper in the inside of the chamber 81, supporting part rotating means 83 is disposed for upward and downward movement through a bearing 819. The supporting part rotating means 83 rotates the supporting part 15 held by first holding means 85 hereinafter described in a horizontal direction and an upward and downward direction. The supporting part rotating means 83 is supported for upward and downward movement by joining means 84 that contacts a first metal film formed on the first smoothed face 161a of the supporting part 15 and a second metal film formed on the second smoothed face 10a of the optical part 10 with each other to join them together.

The joining means 84 includes a ball screw 840 having an axis extending in the Z-axis direction (vertical direction), a guide rail 841 disposed in parallel to the ball screw 840 on a top plate of the chamber 81, a motor 842 coupled to an upper end of the ball screw 840 for rotating the ball screw 840, and a lifting member 843 having therein a nut screwed with the ball screw 840 and having a side portion that slidably contacts with the guide rail 841. When the motor 842 rotates the ball screw 840, the lifting member 843 is moved back and forth in the Z-axis direction under the guidance of the guide rail 841, and also the supporting part rotating means 83 supported by the lifting member 843 is moved back and forth in the Z-axis direction.

The supporting part rotating means 83 includes a rotary shaft 830 having an axial direction, for example, in the Z-axis direction and supported for rotation on the lifting member 843, a motor 832 coupled to an upper end of the rotary shaft 830 for rotating the rotary shaft 830, and a reversing mechanism 833 attached to a lower end of the rotary shaft 830. Further, first holding means 85 for holding the supporting part 15 is attached to the reversing mechanism 833. The rotary shaft 830 is fitted in the chamber 81 through the bearing 819.

The reversing mechanism 833 is configured, for example, from a holder that holds the first holding means 85 thereon, a spindle and a motor for rotating the holder and so forth and can reverse the first holding means 85 upside down. The first holding means 85 can sandwich the supporting part 15 from the side faces to hold the supporting part 15, for example, by a sandwiching clamp 851 that can be moved in the horizontal direction.

For example, at an upper portion of the chamber 81, second holding means 86 for holding the optical part 10 is disposed. The second holding means 86 can sandwich the optical part 10 from the side faces 10c and 10d by a sandwiching clamp 861, which is movable, for example, in the horizontal direction, to hold the optical part 10. The second holding means 86 is upwardly and downwardly movable along the Z-axis direction by lifting means 862 such as, for example, an electric cylinder, a ball screw mechanism or the like.

It is to be noted that the first holding means 85 and the second holding means 86 are not limited to those in the present embodiment and may be, for example, an electrostatic chuck that can attract and hold the supporting part 15 or the optical part 10 also in the chamber 81 that has, for example, a decompression environment (vacuum atmosphere).

At the metal film forming step, the supporting part 15 is held by the first holding means 85 in the chamber 81 in a state in which the first smoothed face 161a side thereof is directed in the downward direction (−Z direction) as depicted in FIG. 10. Further, in the chamber 81, the optical part 10 is held by the second holding means 86 in a state in which the second smoothed face 10a side thereof is directed downwardly.

Then, the loading/unloading port 811 of the chamber 81 is closed with the gate valve 812 and the inside of the chamber 81 is decompressed and exhausted by the vacuum pump 89 to form a vacuum atmosphere. By forming the vacuum atmosphere, the metal M becomes easy to vaporize.

For example, the supporting part rotating means 83 rotates the first holding means 85 around the axis extending in the Z-axis direction to position the supporting part 15 above the table 82. Then, the joining means 84 moves down the first holding means 85 to a predetermined heightwise position in the chamber 81 until the first smoothed face 161a of the supporting part 15 held by the first holding means 85 and the metal M on the table 82 are placed into a state in which they are opposed to each other in a spaced relationship by a predetermined distance in the heightwise direction. Electric power is supplied from the power supply 821 to the heater 820, and the metal M on the table 82 is heated by the heater 820 and dissolves, evaporates and vaporizes (or sublimates). Then, evaporating and sublimating particles of the metal M adhere and are deposited on the first smoothed face 161a of the supporting part 15 to form a first metal film 17. After the first metal film 17 very thin and having a uniform thickness is formed on the overall area of the first smoothed face 161a, the supporting part rotating means 83 rotates the first holding means 85 around the axis extending in the Z-axis direction to retract the supporting part 15 from above the table 82 thereby to complete the formation of the first metal film 17 on the first smoothed face 161a.

For example, the lifting means 862 moves down the second holding means 86 to a predetermined heightwise position in the chamber 81 until the second smoothed face 10a of the optical part 10 held by the second holding means 86 and the metal M on the table 82 are placed into a state in which they are opposed to each other in a spaced relationship by a predetermined distance in the heightwise direction. Electric power is supplied from the power supply 821 to the heater 820 to heat the metal M on the table 82 to vaporize or sublimate, whereupon the vaporized particles of the metal M are deposited on the second smoothed face 10a of the optical part 10 to form a second metal film 11. After the second metal film 11 very thin and having a uniform thickness is formed on the overall area of the second smoothed face 10a, the supply of electric power to the heater 820 is stopped and the metal film forming step ends.

It is to be noted that, in the vacuum vapor deposition apparatus 8, the formation of the first metal film 17 on the first smoothed face 161a of the supporting part 15 and the formation of the second metal film 11 on the second smoothed face 10a of the optical part 10 may be performed simultaneously.

Further, the formation of the first metal film 17 and the formation of the second metal film 11 may be performed by sputtering using a sputtering apparatus. In this case, for example, argon gas is introduced into the sputtering apparatus in vacuum such that argon atoms in plasma generated by application of a voltage collide with a sputtering source (for example, a nickel plate) to eject metal particles from the sputtering source. Then, the metal particles advance toward the supporting part 15 (optical part 10), whose first smoothed face 161*a* (second smoothed face 10*a*) is in a state opposed to the sputtering source. Consequently, the metal particles are deposited on the first smoothed face 161*a* (second smoothed face 10*a*) to form the first metal film (second metal film).

(7) Joining Step

Then, the first metal film 17 of the supporting part 15 and the second metal film 11 of the optical part 10 are contacted with each other such that they are joined together by atomic diffusion bonding. The inside of the chamber 81 keeps the vacuum atmosphere, and the temperature in the chamber 81 is a room temperature.

Figure 11:
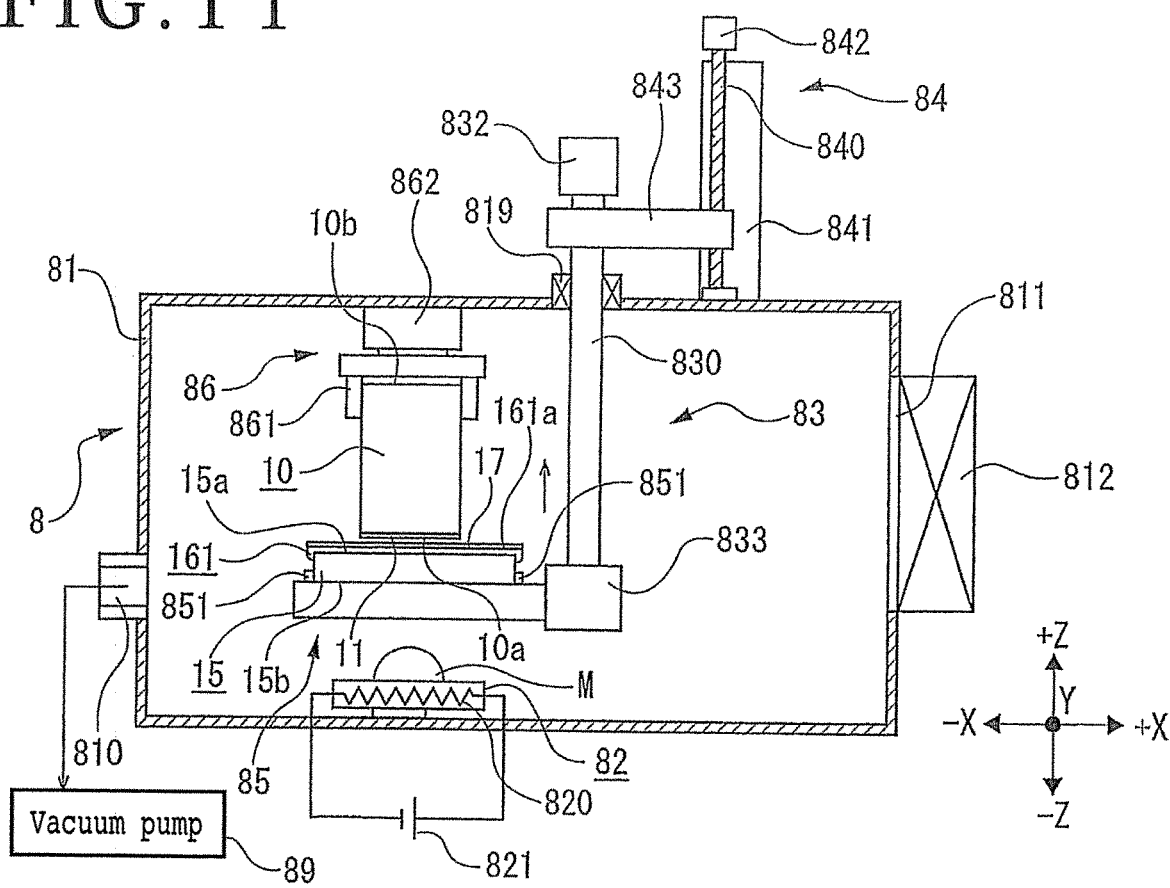
FIG. 11 is a sectional view illustrating a state in which the first metal film and the second metal film are contacted with each other to perform atomic diffusion bonding in the vacuum chamber of the vacuum vapor deposition apparatus.

As depicted in FIG. 11, the first holding means 85 is vertically reversed by the reversing mechanism 833 such that the first metal film 17 of the supporting part 15 held by the first holding means 85 is placed into an upwardly directed state. Further, the supporting part rotating means 83 rotates the first holding means 85 around the axis extending in the Z-axis direction until the supporting part 15 is positioned below the optical part 10 held by the second holding means 86 and the first metal film 17 of the supporting part 15 and the second metal film 11 of the optical part 10 are placed into a state opposed to each other in the Z-axis direction.

For example, the joining means 84 moves the first holding means 85 upwardly until the first metal film 17 of the supporting part 15 and the second metal film 11 of the optical part 10 are brought into contact with each other (with no pressurization or with slight pressurization). As a result, atomic diffusion occurs at a contact interface between the first metal film 17 and the second metal film 11 and metal atoms of them are coupled to each other. Consequently, even if a high pressure is not applied from the supporting part 15 to the optical part 10 by the joining means 84, the first metal film 17 and the second metal film 11 are joined together with a sufficient joining strength.

After the first metal film 17 and the second metal film 11 are joined together, the decompression in the chamber 81 by the vacuum pump 89 is stopped. Then, the gate valve 812 of the loading/unloading port 811 is opened and the supporting part 15 to which the optical part 10 is joined is carried out from within the chamber 81 by the transporting means not depicted.

Figure 12:
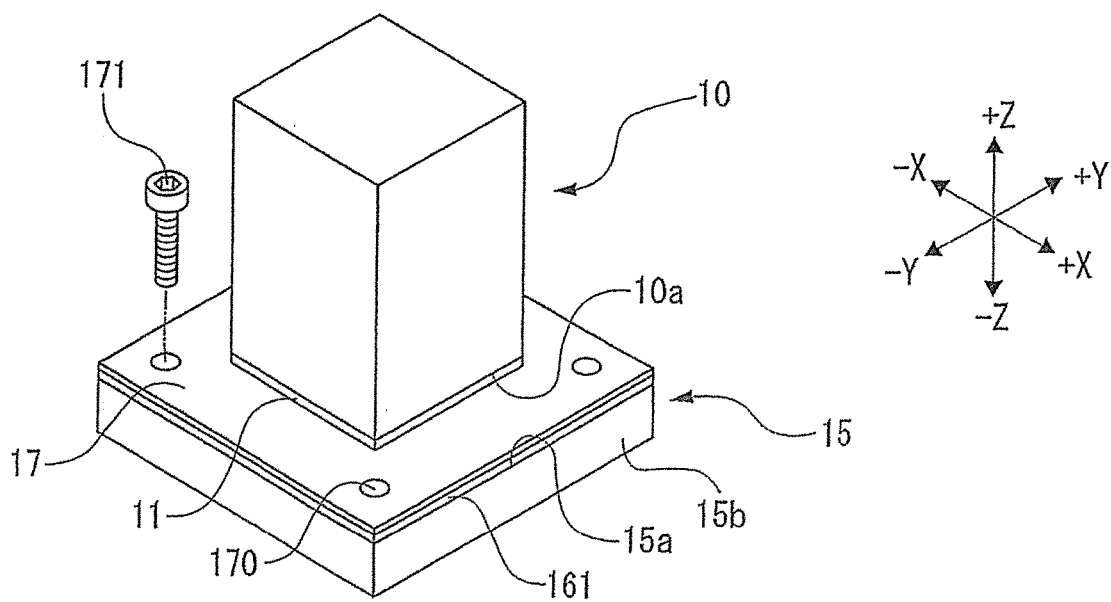
FIG. 12 is a perspective view of the optical part to which the supporting part is joined.

Thereafter, for example, at the four corners of the supporting part 15 to which the optical part 10 is joined in FIG. 12, bolt insertion holes 170 into which fixing bolts 171 are to be inserted are formed to penetrate toward the thicknesswise direction (Z-axis direction), and the supporting part 15 to which the optical part 10 is connected is placed into a fixed state to a predetermined installation location or the like in the laser processing apparatus not depicted by the fixing bolts 171.

The joining step is not limited to the example in which it is performed in a vacuum atmosphere in the chamber 81 as described above. For example, in the case where both the first metal film 17 of the supporting part 15 and the second metal film 11 of the optical part 10 are formed from Au (gold) at the metal film forming step, or in the case where both the first metal film 17 of the supporting part 15 and the second metal film 11 of the optical part 10 are formed from Pt (platinum), the joining step may be performed by contacting the first metal film 17 and the second metal film 11 of gold or platinum with each other in a room-temperature atmospheric pressure space (in the chamber 81 in a state in which the decompression by the vacuum pump 89 is canceled and the gate valve 812 is open) with each other. Further, in this case, the first metal film 17 of the supporting part 15 and the second metal film 11 of the optical part 10 carried out from the chamber 81 may be contacted with each other by contacting means not depicted installed outside the vacuum vapor deposition apparatus 8. This arises from the fact that, since gold or platinum has a nature that an oxide film is less likely to be formed thereon also in an atmospheric pressure space, even in an atmospheric pressure space, the joining faces of the first metal film 17 and the second metal film 11 allow atomic diffusion joining also in an atmospheric pressure space.

As described above, the joining method for an optical part (joining method of the first embodiment) according to the present invention described above includes a metal layer forming step of forming a metal layer 160 and a metal layer 161 by electroless plating and electroplating, respectively, on a surface 15*a* of a supporting part 15, a first smoothed face forming step of polishing (in the present example, CMP polishing) the metal layer 161 formed by the metal layer forming step with a polishing pad 352 such that the metal layer 161 has a predetermined thickness and a first smoothed face 161*a* is formed on the surface 15*a* of the supporting part 15, a second smoothed face forming step of polishing (in the present example, CMP polishing) a surface 10*a* of the optical part 10 with the polishing pad 352 to form a second smoothed face 10*a*, a cleaning step of cleaning the first smoothed face 161*a* and the second smoothed face 10*a* with cleaning water to which an ultrasonic wave is propagated, a metal film forming step of forming a first metal film 17 on the first smoothed face 161*a* by vapor deposition or sputtering and forming a second metal film 11 on the second smoothed face 10*a* by vapor deposition or sputtering in a vacuum chamber (chamber 81 having a vacuum atmosphere), and a joining step of interatomic joining the first metal film 17 and the second metal film 11 by atomic diffusion that occurs between faces at which the first metal film 17 and the second metal film 11 contact with each other. Therefore, the optical part 10 and the supporting part 15 formed from different types of materials can be joined together with high joining force. Further, since the optical part 10 is joined over a somewhat great contact area with the supporting part 15 having a high thermal conductivity, efficient removal of heat from the optical part 10 by the supporting part 15 when the optical part 10 is used can be achieved. Further, since the optical part 10 and the supporting part 15 are joined together through metal, pores (gaps) of fine ceramics that configures the supporting part 15 do not appear at the joining location to the optical part 10, and even if the optical part 10 is used and has heat, the joining force between the supporting part 15 and the optical part 10 does not decrease, and the heat removal efficiency by the supporting part 15 does not decrease.

In the following, steps of a joining method in the case where the joining method according to the present invention (hereinafter referred to as joining method of a second embodiment) is carried out to join the optical part 10 and the supporting part 15 depicted in FIG. 1 together are described. The joining method of the second embodiment is a joining method that utilizes surface-activated room-temperature bonding (SAB).

(1) First Metal Layer Forming Step

Figure 13:
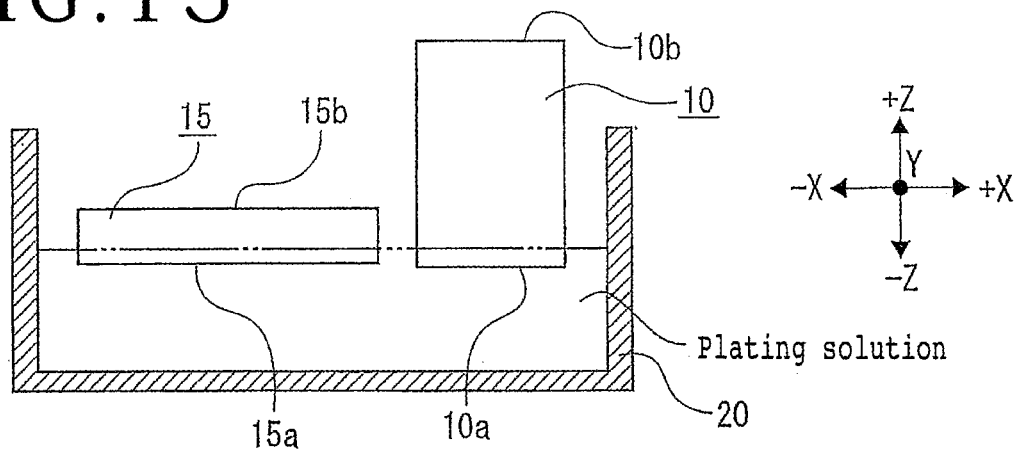
FIG. 13 is a sectional view in the case where the first metal layer is formed by electroless plating on the surface of the optical part and the second metal layer is formed by electroless plating on the surface of the supporting part.

First, a metal layer is formed on a surface 15*a* of a supporting part 15 by electroless plating as depicted in FIG. 13. The first metal layer forming step is carried out similarly as the metal layer forming step in the joining method of the first embodiment. In particular, in the plating tank 20 depicted in FIG. 13, electroless plating is performed for a predetermined period of time to form a first metal layer of a predetermined thickness (for example, 10 μm) on the surface 15a of the supporting part 15.

Further, in order to further increase the thickness of the thus formed first metal layer, electroplating is performed with metal same as the metal, from which the first metal layer is formed, on the first metal layer of the supporting part 15 in the electroplating tank 21 depicted in FIG. 3 similarly as at the metal layer forming step in the joining method of the first embodiment to form a first metal layer 161 (refer to FIG. 14) whose thickness is increased to a predetermined thickness (for example, to 50 μm thick).

Figure 14:
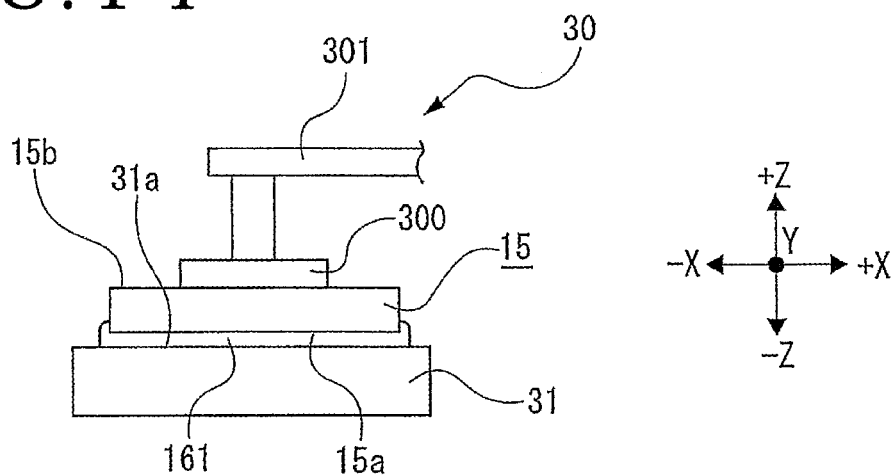
FIG. 14 is a side elevational view illustrating a state in which the supporting part on which the first metal layer is formed is placed on the temporary placement table by the transporting means.

Then, the transporting means 30 depicted in FIG. 14 carries out the supporting part 15 on which the first metal layer 161 is formed from within the plating tank 21 depicted in FIG. 3 and moves the supporting part 15 to a position above the temporary placement table 31 depicted in FIG. 14, and the supporting part 15 is placed on the placement face 31a of the temporary placement table 31 in such a state that the rear face 15b side is directed upwardly. Further, as depicted in FIG. 15, the supporting part 15 is reversed upside down between the surface 15a and the rear face 15b by the reversing means 32 such that the first metal layer 161 is directed upwardly.

(2) First Smoothed Face Forming Step

Figure 15:
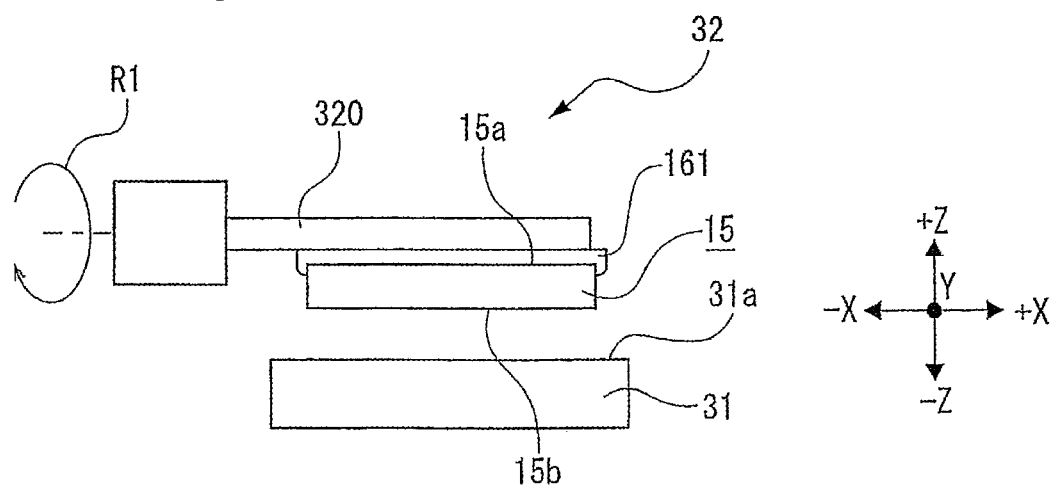
FIG. 15 is a side elevational view illustrating a state in which the supporting part is reversed vertically by reversing means such that the first metal layer is directed upwardly.
Figure 16:
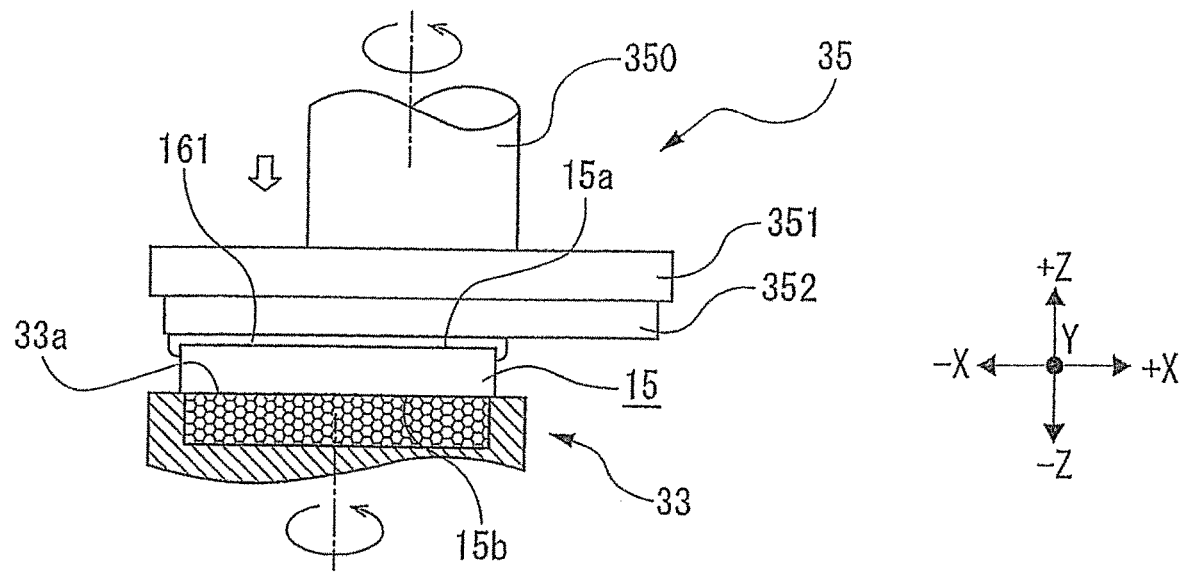
FIG. 16 is a side elevational view illustrating a state in which the first metal layer of the supporting part is polished by the polishing pad.

For example, the reversing means 32 depicted in FIG. 15 places the supporting part 15 on the holding face 33a of the holding table 33 depicted in FIG. 16 in such a state that the first metal layer 161 is directed to the upper side, and is spaced away from the supporting part 15 after the supporting part 15 is sucked and held by the holding table 33.

The polishing means 35 depicted in FIG. 16, for example, CMP polishes the first metal layer 161 formed on the supporting part 15. The CMP polishing of the first metal layer 161 is carried out similarly as at the first smoothed face forming step in the joining method in the first embodiment until the thickness of the first metal layer 161 becomes, for example, approximately 50 μm (equal to or greater than 30 μm but equal to or smaller than 100 μm) and the supporting part 15 comes to have the first smoothed face 161a flattened to a high level of the flatness of 1.5 nm or less. It is to be noted that the first metal layer 161 may be dry polished to form the first smoothed face 161a.

(3) Second Metal Layer Forming Step

In parallel to, or before or after, such first metal layer forming step to first smoothed face forming step for the supporting part 15 as described above, a second metal layer is formed by electroless plating on the surface 10a of the optical part 10 depicted in FIG. 13. In particular, in the plating tank 20 depicted in FIG. 13, electroless plating is performed for a predetermined period of time to form a second metal layer 120 (for example, a nickel layer, refer to FIG. 17) of a predetermined thickness (for example, approximately 10 μm) on the surface 10a of the optical part 10.

Figure 17:
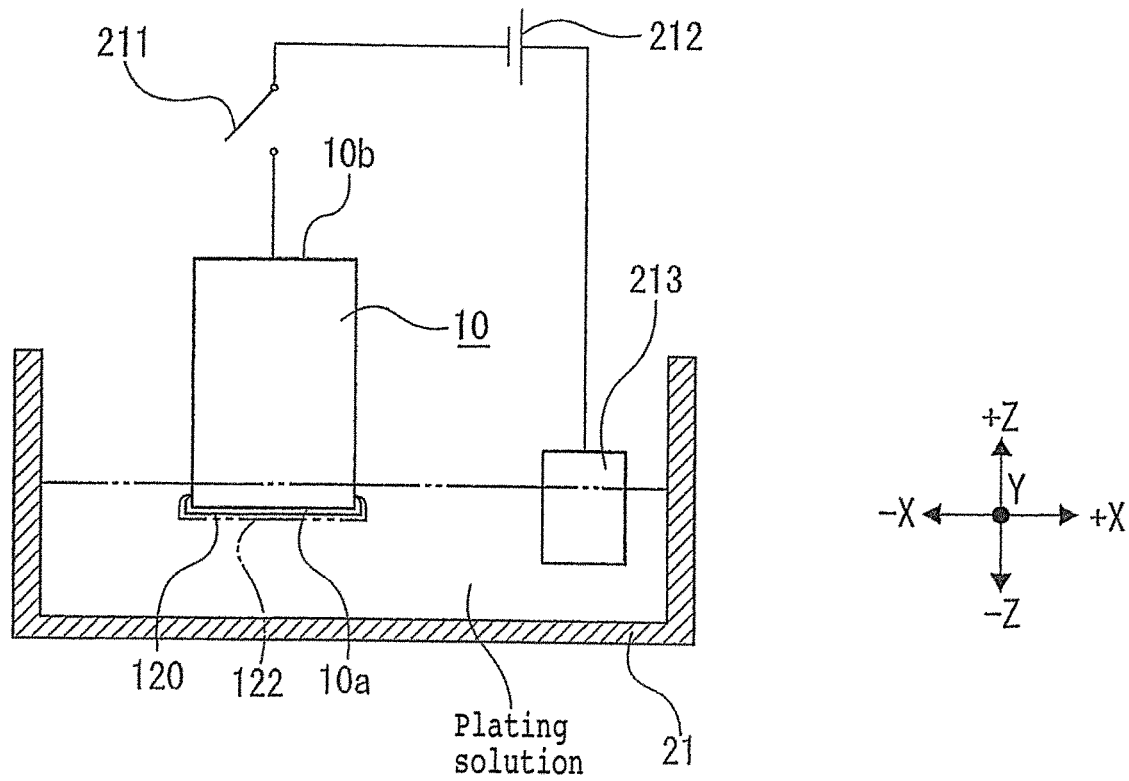
FIG. 17 is a sectional view illustrating a state in which the thickness of the second metal layer formed on the surface of the optical part is increased by electroplating.

In order to further increase the thickness of the second metal layer 120 formed on the surface 10a of the optical part 10, electroplating is performed with a metal (for example, nickel) same as the metal from which the second metal layer 120 is configured on the second metal layer 120 in such an electroplating tank 21 as depicted in FIG. 17. In particular, in the plating tank 21, the second metal layer 120 of the optical part 10 is connected to the negative electrode of the DC power supply 212 through the switch 211. Meanwhile, the electrolytic metal 213 (for example, nickel) is connected to the positive electrode of the DC power supply 212.

Then, the switch 211 is turned on to pass current through the nickel plating solution using the second metal layer 120 of the optical part 10 as a cathode and using the electrolytic metal 213 as an anode. As a result, nickel ion is reduced and precipitated on the second metal layer 120 to further increase the thickness of the second metal layer 120. Then, the electroplating is performed for a predetermined period of time until the thickness of the second metal layer 120 increases to a predetermined thickness (for example, to the thickness of 50 μm that is equal to or greater than 30 μm but equal to or smaller than 100 μm) to form a second metal layer 122.

Then, for example, placement of the optical part 10 on the temporary placement table 31 by the transporting means 30 depicted in FIG. 14 and vertical reversal of the surface 10a and the rear face 10b of the optical part 10 by the reversing means 32 depicted in FIG. 15 are performed. Further, the reversing means 32 carries the optical part 10 onto the holding table 34 depicted in FIG. 18.

(4) Second Smoothed Face Forming Step

Figure 18:
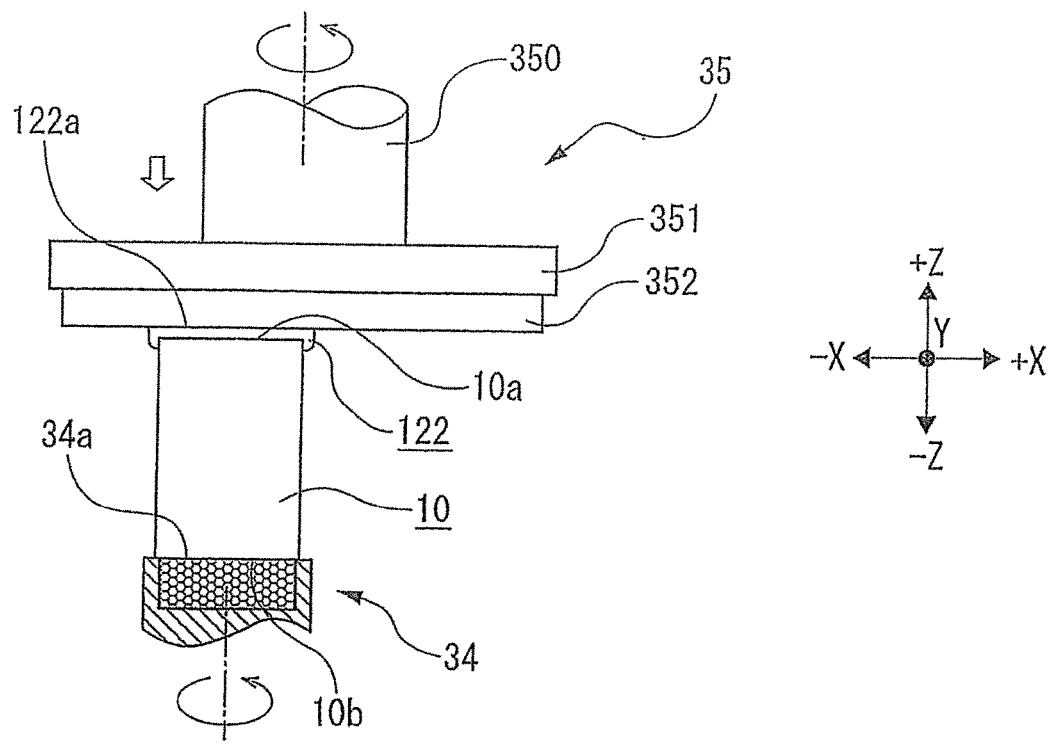
FIG. 18 is a side elevational view illustrating a state in which the second metal layer of the optical part is polished with the polishing pad.

The reversing means 32 places the optical part 10 on a holding face 34a depicted in FIG. 18 in a state in which the second metal layer 122 is directed to the upper side, and the optical part 10 is sucked to and held by the holding table 34. Then, as depicted in FIG. 18, the polishing means 35 moves down until the rotating polishing pad 352 is contacted with the second metal layer 122 of the optical part 10 such that polishing processing is performed. Further, the holding table 34 is rotated at a predetermined rotational speed to rotate the optical part 10 held on the holding face 34a while slurry (slurry in which polishing particles and metal oxidant are contained) is supplied to a contacting location between the polishing pad 352 and the second metal layer 122 of the optical part 10.

Then, after the upper face of the second metal layer 122 of the optical part 10 is polished until the flatness thereof becomes equal to or smaller than, for example, 1.5 nm, the CMP polishing for the second metal layer 122 of the optical part 10 is ended (for example, the thickness of the second metal layer 122 after the polishing is made 30 μm), and the optical part 10 is placed in a state in which it has a second smoothed face 122a. It is to be noted that the second smoothed face 122a may be formed by dry polishing the second metal layer 122.

(5) Cleaning Step

Figure 19:
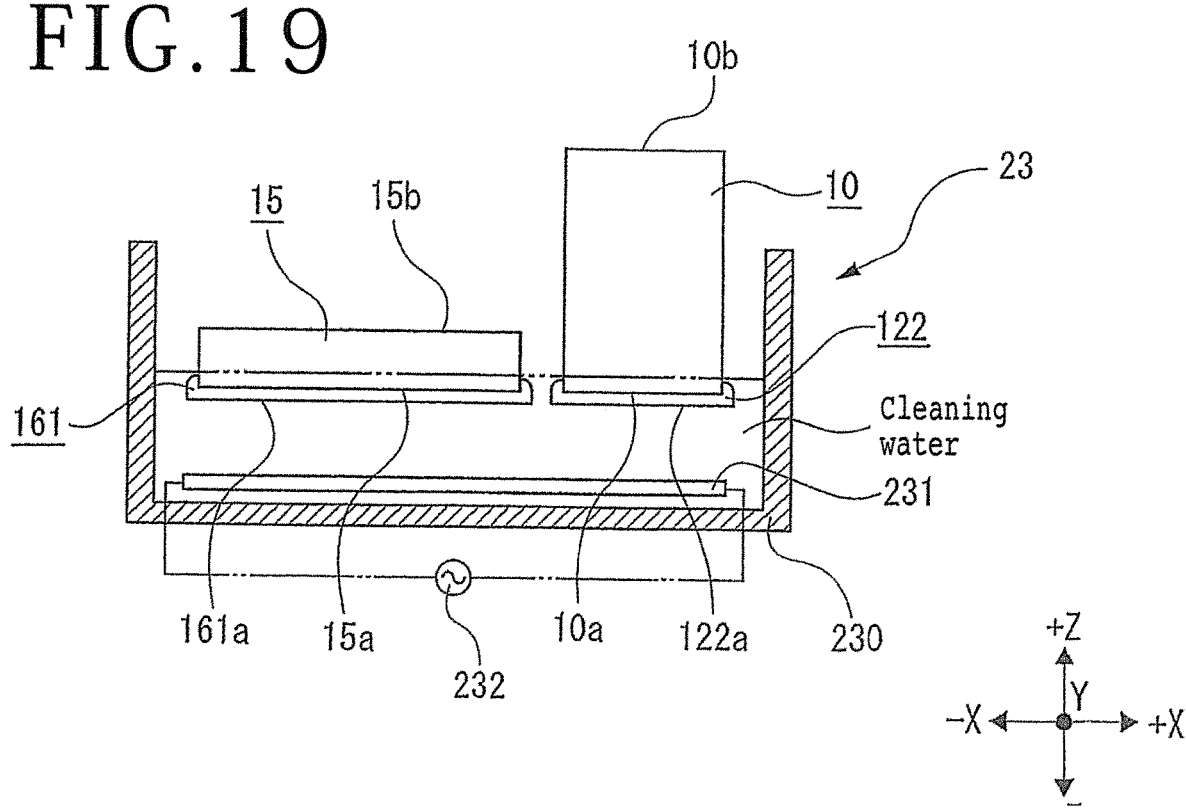
FIG. 19 is a sectional view illustrating a state in which the first smoothed face of the supporting part and the second smoothed face of the optical part are ultrasonically cleaned.

The transporting means not depicted carries the supporting part 15 having the first smoothed face 161a depicted in FIG. 16 and the optical part 10 having the second smoothed face 122a depicted in FIG. 18 into the ultrasonic cleaning apparatus 23 depicted in FIG. 19. In a state in which the supporting part 15 is soaked in cleaning water in the water tank 230 from the first smoothed face 161a side and besides the optical part 10 is soaked in the cleaning water in the water tank 230 from the second smoothed face 122a side, predetermined high frequency electric power is supplied from the high frequency power supply 232 to the ultrasonic wave oscillation unit 231. Then, the first smoothed face 161a of the supporting part 15 and the second smoothed face 122a of the optical part 10 are cleaned by the cleaning water to which an ultrasonic wave oscillated from the ultrasonic wave oscillation unit 231 is propagated.

(6) Film Removing Step

Then, rare gas is supplied into a vacuum chamber in which the supporting part 15 and the optical part 10 are accommodated, and ion or plasma generated by application of a high frequency voltage to the rare gas is irradiated upon the first smoothed face 161a of the supporting part 15 and the second smoothed face 122a of the optical part 10 to remove films that are not required for joining such as an oxide film, a nitride film and so forth of the first smoothed face 161a and the second smoothed face 122a. Such oxide film, nitride film and so forth as just described are formed, for example, at a stage at which the supporting part 15 and the optical part 10 are carried to a film removing apparatus 7 depicted in FIG. 20 and so forth. In particular, the first smoothed face 161a and the second smoothed face 122a in the atmosphere during carrying are covered immediately by an oxide film by oxygen, attracted water and organic molecules.

Figure 20:
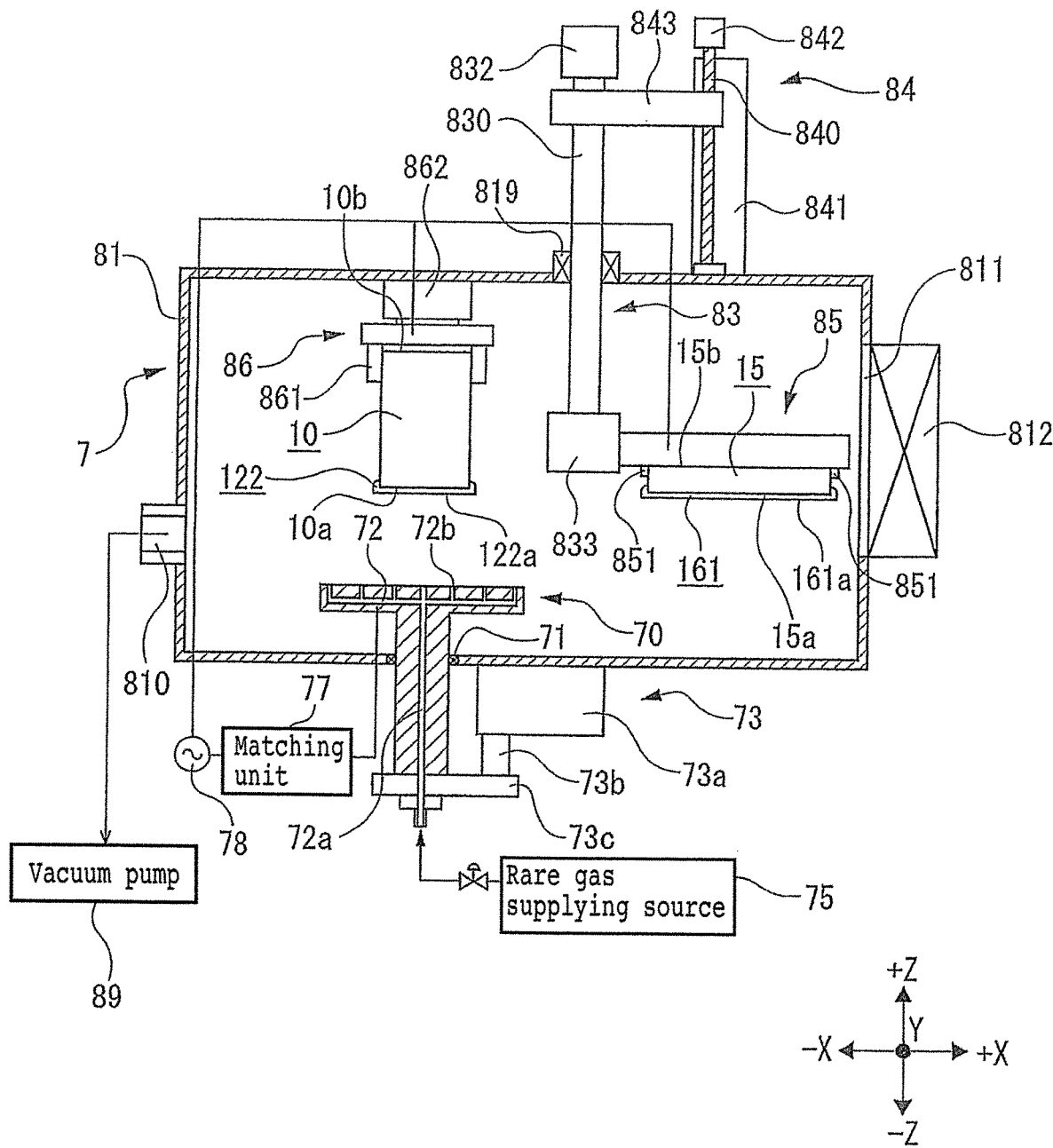
FIG. 20 is a sectional view illustrating a state in which the first smoothed face of the supporting part is activated and the second smoothed face of the optical part is activated in a vacuum chamber of a film removing apparatus.

The supporting part 15 and the optical part 10 are carried to the film removing apparatus 7 depicted in FIG. 20, for example, by transporting means not depicted. The film removing apparatus 7 includes, for example, similarly to the vacuum vapor deposition apparatus 8 depicted in FIG. 10, a chamber 81, supporting part rotating means 83, joining means 84, first holding means 85, second holding means 86, vacuum pump 89 and so forth. It is to be noted that the first holding means 85 and the second holding means 86 are not limited to those in the present embodiment and may be, for example, an electrostatic chuck that can attract and hold the supporting part 15 or the optical part 10 also in the chamber 81 that has, for example, a decompression environment (vacuum atmosphere) or the like.

At a lower portion in the inside of the chamber 81 of the film removing apparatus 7, a gas jetting head 70 for jetting rare gas into the chamber 81 is disposed for upward and downward movement through a bearing 71. In the inside of the gas jetting head 70 having a vertical cross section of a substantially T shape, a gas diffusion space 72 is provided, and a gas introduction path 72a is communicated with a lower portion of the gas diffusion space 72 while a plurality of gas delivery paths 72b are communicated with an upper portion of the gas diffusion space 72. An upper end of the gas delivery paths 72b is open to the upper face of the gas jetting head 70.

An air cylinder 73 for moving the gas jetting head 70 upwardly and downwardly is connected to the gas jetting head 70. The air cylinder 73 includes, for example, a cylinder tube 73a including a piston in the inside thereof and attached to a lower face of the chamber 81, an air cylinder 73 inserted in the cylinder tube 73a and attached at an upper end side thereof to the piston, and a connection member 73c fixed to a lower end side of the piston rod 73b and supporting the gas jetting head 70 thereon. By supplying (or discharging) air into (or from) the cylinder tube 73a to change the internal pressure of the cylinder tube 73a, the gas jetting head 70 is moved upwardly and downwardly together with the piston rod 73b. It is to be noted that the film removing apparatus 7 may be configured otherwise such that it does not include the air cylinder 73.

A rare gas supplying source 75 is communicated with the gas introduction path 72a formed in the inside of the gas jetting head 70. The rare gas supplying source 75 has, for example, He, Ne, Ar, Kr or Xe stored therein. A high frequency power supply 78 is electrically connected to the gas jetting head 70 through a matching unit 77 and is electrically connected also to the first holding means 85 and the second holding means 86. By supplying high frequency electric power from the high frequency power supply 78 to the gas jetting head 70, the first holding means 85 and the second holding means 86 through the matching unit 77, rare gas delivered upwardly from the gas delivery paths 72b can be ironized or converted into plasma, and the ionized or plasma rare gas can be moved to the first holding means 85 and the second holding means 86 side.

At the film removing step, the first holding means 85 first holds the supporting part 15 in the chamber 81 in a state in which the first smoothed face 161a side is directed downwardly (in the -Z direction) in the chamber 81 as depicted in FIG. 20. Further, in the chamber 81, the second holding means 86 holds the optical part 10 in a state in which the second smoothed face 122a side is directed downwardly.

The loading/unloading port 811 of the chamber 81 is closed up with the gate valve 812 and the inside of the chamber 81 is decompressed and exhausted to establish a vacuum atmosphere by the vacuum pump 89. For example, the supporting part rotating means 83 rotates the first holding means 85 around the axis extending in the Z-axis direction to position the supporting part 15 above the gas jetting head 70. Then, the joining means 84 moves the first holding means 85 downwardly to a predetermined heightwise position in the chamber 81 such that the first smoothed face 161a of the supporting part 15 held by the first holding means 85 and the gas jetting head 70 are placed in a state in which they are opposed to each other with a predetermined distance left therebetween in the heightwise direction.

Rare gas is supplied from the rare gas supplying source 75 into the gas introduction path 72a in the gas jetting head 70 such that it is jetted uniformly toward the first smoothed face 161a of the supporting part 15 held by the first holding means 85 from the openings of the gas delivery paths 72b. Further, the rare gas is introduced into the chamber 81 and high frequency electric power is supplied from the high frequency power supply 78 to the gas jetting head 70 and the first holding means 85 such that a high frequency electric field is generated between the gas jetting head 70 and the first smoothed face 161a of the supporting part 15 to convert the rare gas into ion or plasma.

The rare gas in the form of ion or plasma having high energy moves up in the chamber 81 until it arrives at the first smoothed face 161a of the supporting part 15. Then, a contamination layer, an oxide layer, a nitride layer and so forth by water molecules and so forth adhering to the first smoothed face 161a are removed by the rare gas in the form of ion or plasma (sputtering etched) and the first smoothed face 161a is activated (metal atoms having joiners are placed into an exposed state).

After the overall area of the first smoothed face 161a is subject to removal of an oxide film and so forth and activation for a predetermined period of time, the supporting part rotating means 83 rotates the first holding means 85 around the axis extending in the Z-axis direction to retract the supporting part 15 from above the gas jetting head 70, thereby completing the removal of an oxide film and so forth and activation for the first smoothed face 161a.

For example, the lifting means 862 moves down the second holding means 86 to a predetermined heightwise position in the chamber 81 to establish a state in which the second smoothed face 122a of the optical part 10 held on the second holding means 86 and the gas jetting head 70 are opposed to each other with a predetermined distance left therebetween in the heightwise direction. Then, removal of an oxide film and so forth and activation for the second smoothed face 122a are performed similarly to those in the case for the first smoothed face 161a. After removal of an oxide film and so forth and activation for the second smoothed face 122a are performed, the supply of rare gas into the chamber 81 and the voltage application by the high frequency power supply 78 are stopped.

It is to be noted that, in the film removing apparatus 7, the removal of a film that is unnecessary for joining of the first smoothed face 161a of the supporting part 15 and removal of a film that is unnecessary for joining of the second smoothed face 122a of the optical part 10 may be performed simultaneously by providing two gas jetting heads 70 in the chamber 81 or by further widening the gas jetting face of the gas jetting head 70.

(7) Joining Step

After the film removing step, the activated first smoothed face 161a of the supporting part 15 and the activated second smoothed face 122a of the optical part 10 are contacted with each other and joined together by metal bonding. The inside of the chamber 81 keeps the vacuum atmosphere and the temperature in the chamber 81 is a room temperature.

Figure 21:
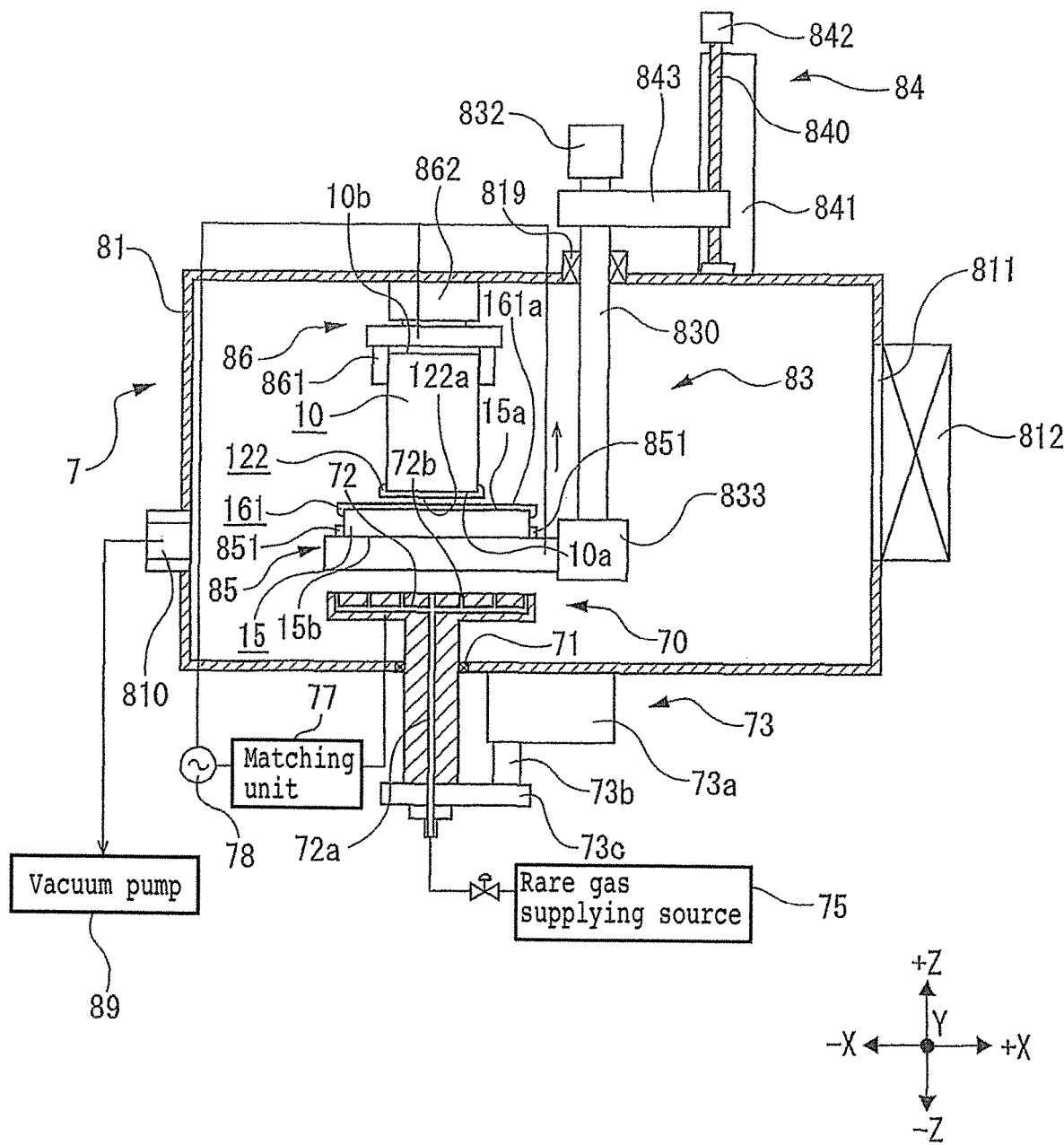
FIG. 21 is a sectional view illustrating a state in which the activated first smoothed face of the supporting part and the activated second smoothed face of the optical part are contacted with each other such that they are joined together by metal bonding in the vacuum chamber of the film removing apparatus.

As depicted in FIG. 21, the first holding means 85 is reversed vertically by the reversing mechanism 833 to place the supporting part 15 held by the first holding means 85 into a state in which the first smoothed face 161a is directed to the upper side. Further, the supporting part rotating means 83 rotates the first holding means 85 around the axis extending in the Z-axis direction until the supporting part 15 is positioned below the optical part 10 held by the second holding means 86 and the first smoothed face 161a of the supporting part 15 and the second smoothed face 122a of the optical part 10 are placed into a state in which they are opposed to each other in the Z-axis direction.

For example, the joining means 84 moves the first holding means 85 upwardly to contact the first smoothed face 161a of the supporting part 15 and the second smoothed face 122a of the optical part 10 with each other. As a result, the two parts are joined together (metal bonded) on the atomic level by joiners appearing on the activated joining faces. According to such surface-activated room-temperature bonding, residual stress or the like does not remain at the joining location, and also the joining strength is sufficient.

After the first metal film 17 and the second metal film 11 are joined together, the decompression in the chamber 81 by the vacuum pump 89 is stopped. Then, the gate valve 812 of the loading/unloading port 811 is opened and the supporting part 15 to which the optical part 10 is joined is carried out from within the chamber 81 by transporting means not detected.

Figure 22:
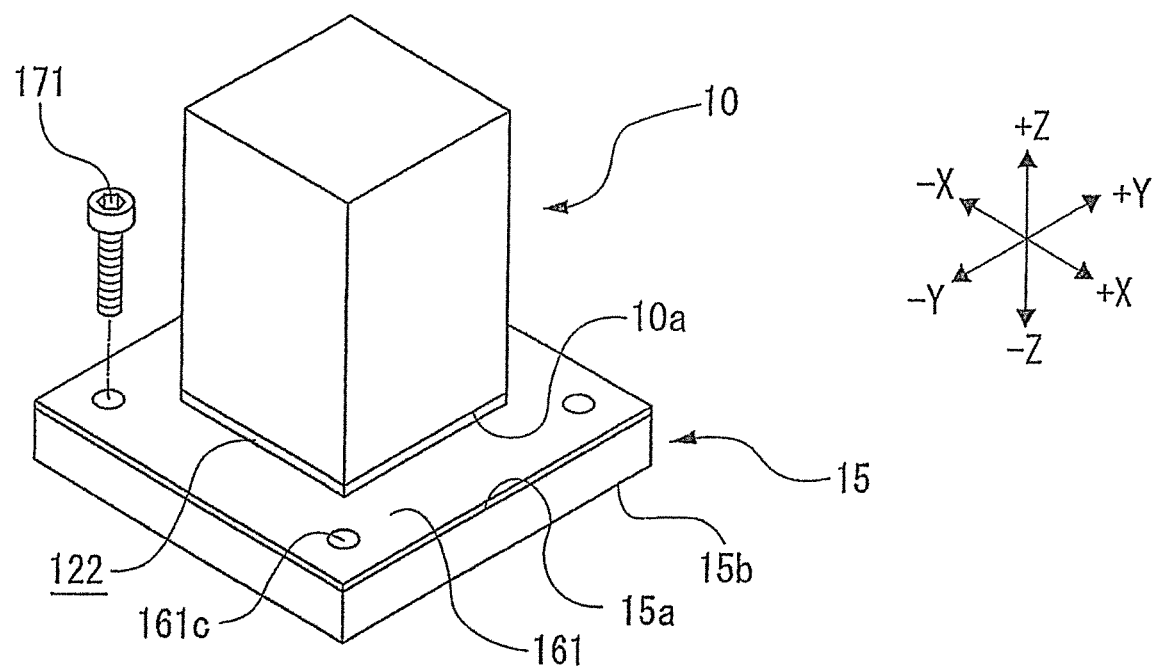
FIG. 22 is a perspective view of the optical part to which the supporting part is joined.

Thereafter, for example, at the four corners of the supporting part 15 to which the optical part 10 is joined in FIG. 22, bolt insertion holes 161c into which fixing bolts 171 are to be inserted are formed to penetrate toward the thickness-wise direction (Z-axis direction), and the supporting part 15 to which the optical part 10 is joined is placed into a fixable state to a predetermined installation location or the like in the laser processing apparatus not depicted by the fixing bolts 171.

The joining step is not limited to the example in which it is performed in a vacuum atmosphere in the chamber 81 as described above. For example, in the case where both the metal layer 161 of the supporting part 15 and the second metal layer 122 of the optical part 10 are formed from Au (gold) or in the case where both the metal layer 161 of the supporting part 15 and the second metal layer 122 of the optical part 10 are formed from Pt (platinum) at the first metal layer forming step and the second metal layer forming step, the joining step may be performed by contacting the first smoothed face 161a of the supporting part 15 and the second smoothed face 122a of the optical part 10 with each other in an atmospheric space of a room temperature (for example, in the chamber 81 in a state in which the decompression by the vacuum pump 89 is canceled and the gate valve 812 is open). Further, in this case, the first smoothed face 161a of the supporting part 15 and the second smoothed face 122a of the optical part 10 carried out from the chamber 81 may be contacted with each other by contacting means not depicted installed outside the vacuum vapor deposition apparatus 8.

This arises from the fact that, since an oxide film is less liable to be formed on gold and platinum even in an atmospheric pressure space, the first smoothed face 161a and the second smoothed face 122a after activated can perform surface-activated room-temperature bonding also in an atmospheric pressure space.

As described above, the joining method of an optical part (joining method of the second embodiment) according to the present invention described above includes a first metal layer forming step of forming a first metal layer 161 on a surface 15a of a supporting part 15 made of fine ceramics by electroless plating and electroplating, a second metal layer forming step of forming a second metal layer 122 on a surface 10a of an optical part 10 made of quartz glass material by electroless plating and electroplating, a first smoothed face forming step of polishing (in the present example, CMP polishing) the first metal layer 161 to a predetermined thickness with a polishing pad 352 and forming a first smoothed face 161a, a second smoothed face forming step of polishing (in the present example, CMP polishing) the second metal layer 122 to a predetermined thickness with the polishing pad 352 and forming a second smoothed face 122a, a cleaning step of cleaning the first smoothed face 161a and the second smoothed face 122a with ultrasonic cleaning water to which an ultrasonic wave is propagated, a film removing step of irradiating ion or plasma, which is generated by supplying rare gas into a vacuum chamber of a chamber 81 in which the supporting part 15 and the optical part 10 are accommodated and applying a high frequency voltage to the rare gas, upon the first smoothed face 161a and the second smoothed face 122a to remove films such as an oxide film or a nitride film unnecessary for joining of the first smoothed face 161a and the second smoothed face 122a, and a joining step of contacting, after the film removing step, the activated first smoothed face 161a and the activated second smoothed face 122a with each other to join the first smoothed face 161a and the second smoothed face 122a to each other by metal bonding. Therefore, the optical part 10 and the supporting part 15 made of different materials from each other can be joined together by strong joining force, and by joining the optical part 10 over a certain great contact area to the supporting part 15 having a high thermal conductivity, efficient heat removal by the supporting part 15 upon use of the optical part 10 can be achieved. Further, since the optical part 10 and the supporting part 15 are joined together through metal, pores (gaps) of the fine ceramics configuring the supporting part 15 do not appear at the joining location to the optical part 10, and even if the optical part 10 is used and comes to have heat, the joining force between the supporting part 15 and the optical part 10 does not drop and the heat removal efficiency by the supporting part 15 does not drop.

The joining method for an optical part according to the present invention is not limited to the first and second embodiments described above, and also the configurations of the various apparatus depicted in the accompanying drawings can be changed suitably within a scope within which the advantageous effects of the present invention can be exhibited.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A joining method for an optical part for joining an optical part made of quartz glass material and a supporting part made of fine ceramics for supporting the optical part to each other, comprising:
- a metal layer forming step of forming a metal layer on a surface of the supporting part by electroless plating;
- a first smoothed face forming step of polishing the metal layer formed by the metal layer forming step with a polishing pad to a given thickness and forming a first smoothed face on the surface of the supporting part;
- a second smoothed face forming step of polishing a surface of the optical part with the polishing pad to form a second smoothed face;
- a cleaning step of cleaning the first smoothed face and the second smoothed face with cleaning water to which an ultrasonic wave is propagated;
- a metal film forming step of forming a first metal film on the first smoothed face by vapor deposition or sputtering and forming a second metal film on the second smoothed face by vapor deposition or sputtering in a vacuum chamber; and
- a joining step of joining the first metal film and the second metal film by interatomic joining by atomic diffusion that occurs between the contacting faces of the first metal film and the second metal film.

2. The joining method for an optical part according to claim 1, wherein
the joining step is carried out in the vacuum chamber.

3. The joining method for an optical part according to claim 1, wherein
the metal film forming step forms the first metal film and the second metal film using Au (gold) or Pt (platinum); and
the joining step is performed by contacting the first metal film and the second metal film of gold films or platinum films with each other in an atmospheric pressure space.

4. A joining method for an optical part for joining an optical part made of quartz glass material and a supporting part made of fine ceramics for supporting the optical part to each other, comprising:
- a first metal layer forming step of forming a first metal layer on a surface of the supporting part by electroless plating;
- a second metal layer forming step of forming a second metal layer on a surface of the optical part by electroless plating;
- a first smoothed face forming step of polishing the first metal layer to a given thickness with a polishing pad and forming a first smoothed face;
- a second smoothed face forming step of polishing the second metal layer to a given thickness with the polishing pad and forming a second smoothed face;
- a cleaning step of cleaning the first smoothed face and the second smoothed face with ultrasonic cleaning water to which an ultrasonic wave is propagated;
- a film removing step of irradiating ion or plasma, which is generated by supplying rare gas into a vacuum chamber in which the supporting part and the optical part are accommodated and applying a high frequency voltage to the rare gas, upon the first smoothed face and the second smoothed face to remove films such as an oxide film or a nitride film unnecessary for joining of the first smoothed face and the second smoothed face; and
- a joining step of contacting, after the removing step, an activated first smoothed face and an activated second smoothed face with each other to join the first smoothed face and the second smoothed face to each other by metal bonding.

5. The joining method for an optical part according to claim 4, wherein
the joining step is carried out in the vacuum chamber.

6. The joining method for an optical part according to claim 4, wherein
the first metal layer and the second metal layer are formed using Au (gold) or Pt (platinum), and the joining step is carried out in an atmospheric pressure space.

* * * * *